(12) United States Patent
Hauck

(10) Patent No.: US 11,874,836 B2
(45) Date of Patent: Jan. 16, 2024

(54) CONFIGURING GRAPH QUERY PARALLELISM FOR HIGH SYSTEM THROUGHPUT

(71) Applicant: SAP SE, Walldorf (DE)

(72) Inventor: Matthias Hauck, Frankfurt (DE)

(73) Assignee: SAP SE, Walldorf (DE)

( * ) Notice: Subject to any disclaimer, the term of this patent is extended or adjusted under 35 U.S.C. 154(b) by 168 days.

(21) Appl. No.: 17/375,998

(22) Filed: Jul. 14, 2021

(65) Prior Publication Data
US 2023/0014681 A1 Jan. 19, 2023

(51) Int. Cl.
*G06F 16/2453* (2019.01)
*G06F 16/901* (2019.01)
*G06F 9/48* (2006.01)

(52) U.S. Cl.
CPC ...... *G06F 16/24545* (2019.01); *G06F 9/4881* (2013.01); *G06F 16/24532* (2019.01); *G06F 16/9024* (2019.01)

(58) Field of Classification Search
CPC ......... G06F 16/24545; G06F 16/24532; G06F 16/9024; G06F 9/4881
USPC ........................................................ 707/720
See application file for complete search history.

(56) References Cited

U.S. PATENT DOCUMENTS

| | | |
|---|---|---|
| 10,534,575 B1 | 1/2020 | Hauck |
| 2011/0035369 A1* | 2/2011 | Halasipuram ..... G06F 16/24549 707/720 |
| 2014/0137130 A1 | 5/2014 | Jacob et al. |
| 2017/0060958 A1 | 3/2017 | Van et al. |
| 2020/0285643 A1* | 9/2020 | Kadiam ............ G06F 16/24542 |
| 2020/0380011 A1* | 12/2020 | Zhong .................. G06F 9/4881 |

OTHER PUBLICATIONS

Extended European Search Report issued in European Appln. No. 21206465.3 dated Apr. 25, 2022, 11 pages.
Jiang et al., "Performance Characterization of Multi-threaded Graph Processing Applications on Many-Integrated-Core Architecture" 2018 IEEE International Symposium on Performance Analysis of Systems and Software, 2018, 10 pages.

(Continued)

*Primary Examiner* — Robert W Beausoliel, Jr.
*Assistant Examiner* — Lauren Zannah Ganger
(74) *Attorney, Agent, or Firm* — Fish & Richardson P.C.

(57) ABSTRACT

The present disclosure involves systems, software, and computer implemented methods for configuring graph query parallelism for high system throughput. One example method includes receiving a query to be executed against a graph database. System properties are determined of a system in which the query is to be executed. Algorithmic properties are determined of at least one algorithm to be used to execute the query. Graph data statistics are determined for the graph database. Graph traversal estimations are determined for a first iteration of the graph query and an estimated cost model is determined for the first iteration based on the graph traversal estimations. Estimated thread boundaries are determined for performing parallel execution of the first iteration. Work packages of vertices to be processed during the execution of the first iteration are determined based on the first estimated cost model and the work packages are provided to a work package scheduler.

20 Claims, 23 Drawing Sheets

(56) References Cited

OTHER PUBLICATIONS

Aberger et al., "EmptyHeaded: boolean algebra based graph processing." ArXiv e-prints, Mar. 2015, 21 pages.
Balaji et al., "When is graph reordering an optimization?" In IEEE International Symposium on Workload Characterization, 2018, 12 pages.
Beamer et al., "Direction-optimizing breadth-first search." SC'12: Proceedings of the International Conference on High Performance Computing, Networking, Storage and Analysis, Nov. 2012, 13 pages.
Beamer et al., "Locality exists in graph processing: Workload characterization on an ivy bridge server." 2015 IEEE International Symposium on Workload Characterization, Oct. 2015, 10 pages.
Bonifati et al., "Querying graphs." Synthesis Lectures on Data Management 10.3, Oct. 2018, 184 pages.
Dhulipala et al., "Julienne: A framework for parallel graph algorithms using work-efficient bucketing." Proceedings of the 29th ACM Symposium on Parallelism in Algorithms and Architectures, Jul. 2017, 12 pages.
Gonzalez et al., "Graphx: Graph processing in a distributed dataflow framework." 11th {USENIX} Symposium on Operating Systems Design and Implementation, Oct. 2014, 15 pages.
Hauck et al., "Can Modern Graph Processing Engines Run Concurrent Queries Efficiently?." Proceedings of the Fifth International Workshop on Graph Data-management Experiences & Systems, May 2017, 6 pages.
Hauck et al., "Highspeed graph processing exploiting main-memory col. stores." European Conference on Parallel Processing. Springer, Cham, Aug. 2015, 12 pages.
Hauck et al., "Software-based Buffering of Associative Operations on Random Memory Addresses" In 33rd IEEE International Parallel & Distributed Processing Symposium, May 2019, 10 pages.
Hong et al., "Green-marl: a dsl for easy and efficient graph analysis" In Proceedings of the seventeenth international conference on Architectural Support for Programming Languages and Operating Systems, Mar. 2012, 14 pages.
Kulkarni et al., "Optimistic parallelism requires abstractions." Proceedings of the 28th ACM SIGPLAN Conference on Programming Language Design and Implementation, Jun. 2007, 12 pages.
Pan et al., "Congra: Towards efficient processing of concurrent graph queries on shared-memory machines." 2017 IEEE International Conference on Computer Design, Nov. 2017, 8 pages.
Psaroudakis et al., "Sharing data and work across concurrent analytical queries." Proceedings of the 39th International Conference on Very Large Data Bases. No. CONF. 2013, 12 pages.
Psaroudakis et al., "Task scheduling for highly concurrent analytical and transactional main-memory workloads." Proceedings of the Fourth International Workshop on Accelerating Data Management Systems Using Modern Processor and Storage Architectures (ADMS 2013). No. CONF, 2013, 10 pages.
Rehrmann et al., "Sharing opportunities for OLTP workloads in different isolation levels." Proceedings of the VLDB Endowment 13.10, Jun. 2020, 13 pages.
Shun et al., "Ligra: a lightweight graph processing framework for shared memory." Proceedings of the 18th ACM SIGPLAN symposium on Principles and practice of parallel programming, Feb. 2013, 12 pages.
Snap.stanford.edu [online], "SNAP Datasets: Stanford large network dataset collection" Jun. 2014, [retrieved on Jun. 29, 2021], retrieved from: URL <http://snap.stanford.edu/data>, Jun. 2014, 6 pages.
Tetzel et al., "Efficient Compilation of Regular Path Queries." Datenbank-Spektrum 20.3, Nov. 2020, 17 pages.
Verstraaten et al., "Mix-and-Match: A Model-driven Runtime Optimisation Strategy for BFS on GPUs." 2018 IEEE/ACM 8th Workshop on Irregular Applications: Architectures and Algorithms, Nov. 2018, 8 pages.
Wang et al., "Gunrock: A high-performance graph processing library on the GPU." Proceedings of the 21st ACM SIGPLAN Symposium on Principles and Practice of Parallel Programming, Feb. 2016, 12 pages.
Whang et al., "Scalable data-driven pagerank: Algorithms, system issues, and lessons learned." European Conference on Parallel Processing. Springer, Berlin, Heidelberg, Aug. 2015, 13 pages.
Zhang et al., "Graphit: A high-performance graph dsl." Proceedings of the ACM on Programming Languages 2, OOPSLA, Article 121, Nov. 2018, 30 pages.
Zhang et al., "NUMA-aware graph-structured analytics." Proceedings of the 20th ACM SIGPLAN Symposium on Principles and Practice of Parallel Programming, Jan. 2015, 11 pages.
Zhao et al., "GraphM: an efficient storage system for high throughput of concurrent graph processing." Proceedings of the International Conference for High Performance Computing, Networking, Storage and Analysis, Nov. 2019, 13 pages.

* cited by examiner

Parameters for traversal behavior estimation

| Parameter | Description |
|---|---|
| $V$ — 402 | All vertices in the graph |
| $V_{touched}$ — 404 | Vertices that are touched via edges |
| $V_{new}$ — 406 | Vertices that are newly found after each iteration |
| $V_{reach}$ — 408 | Vertices that are reachable via a graph traversal (i.e., neither isolated nor without an incoming edge) |
| $V_{local}$ — 410 | Set of vertices in the current (local) queue |
| $F_{local}$ — 412 | Set of found vertices |
| $E_{local}$ — 414 | Set of vertex edges for the local queue $V_{local}$ |
| $p_{v\,visits}$ — 416 | Probability that a vertex will be visited by vertex $v$ |
| $V_{no\,visit}$ — 418 | Vertices that have not been visited before |
| $p_{no\,visit}$ — 420 | Probability that a vertex has not been visited |

FIG. 4

$$|V_{touched}| = \left(1 - \prod_{v \in V_{queue}} (1 - p_{v\,visits})\right) \cdot |V_{reach}| \quad (1)$$

$$\approx \left(1 - \prod_{v \in V_{queue}} \left(1 - \frac{deg^+(v)}{|V_{reach}|}\right)\right) \cdot |V_{reach}| \quad (2)$$

$$\approx \left(1 - \left(1 - \frac{\overline{deg^+(V)}}{|V_{reach}|}\right)^{|V_{queue}|}\right) \cdot |V_{reach}| \quad (3)$$

FIG. 5

$$|V_{new}| = \left(1 - p_{no\ visit} \cdot \prod_{v \in V_{queue}} (1 - p_{o\ visits})\right) \cdot |V_{reach}| \quad (4)$$

$$\approx \left(1 - \frac{|V_{no\ visit}|}{|V_{reach}|} \cdot \prod_{v \in V_{queue}} \left(1 - \frac{deg^+(v)}{|V_{reach}|}\right)\right) \cdot |V_{reach}| \quad (5)$$

$$\approx \left(1 - \frac{|V_{no\ visit}|}{|V_{reach}|} \cdot \left(1 - \frac{\overline{deg^+(V)}}{|V_{reach}|}\right)^{|V_{queue}|}\right) \cdot |V_{reach}| \quad (6)$$

FIG. 6

Parameters of the cost model

| Parameter | Description |
|---|---|
| $i$ | Item of generic type, including vertex($v$), (new) found vertex($f$) or edge($e$) |
| $I$ | Set of items of generic type, including set of vertices in the current (local) queue ($V_{local}$), the set of found vertices ($F_{local}$), or the set of vertex edges for the local queue ($E_{local}$) |
| $\|I\|$ | Number of elements in a given set |
| $T$ | Number of threads used |
| $M$ | Amount of accessed data |
| $C_{sub}(i, T, M)$ | Sub-cost of execution for a given item, i.e., processing only vertex $v$ or $f$, or edge $e$ |
| $C_{total}(v, T, M)$ | Total cost of parallel execution for vertex $v$ |
| $L_{op}$ | Latency of an arithmetic operation |
| $L_{mem}(M)$ | Latency of a non-atomic memory access, depending on the size $M$ of the accessed data |
| $L_{atomic}(T, M)$ | Latency of an atomic operation, depending on the size $M$ of the accessed data and the amount of threads $T$ |
| $N_{ops}(i)$ | Number of arithmetic operations used to process item $i$ |
| $N_{mem}(i)$ | Number of memory operations (non atomic load & stores) used to process item $i$ |
| $N_{atomics}(i)$ | Number of atomic operations used to process item $i$ |

FIG. 7

$$C_{sub}(i,T,M) = N_{ops}(i) \cdot L_{op}$$
$$+ N_{atomics}(i) \cdot L_{atomic}(T,M)$$
$$+ N_{mem}(i) \cdot L_{mem}(M) \quad (7)$$

$$C_{total}(T,M) = C_{sub}(v,T,M) + \frac{|E_{local}|}{|V_{local}|} \cdot C_{sub}(e,T,M)$$
$$+ \frac{|F_{local}|}{|V_{local}|} \cdot C_{sub}(f,T,M) \quad (8)$$

FIG. 8

Parameters for the work package and thread boundaries estimation

| Parameter | Description |
|---|---|
| $C_{T\ overhead}$ 902 | Start cost for a single thread (typically a few μs) |
| $C_{T\ min}$ 904 | Minimum work per thread (larger than $C_{T\ overhead}$) |
| $C_{para\ startup}$ 906 | Start cost for parallel execution (typically a few μs) |
| $P$ 908 | Maximum number of cores |
| $T_{min/max}$ 910 | Minimum and maximum thread bound |
| $J_{min/max}$ 912 | Minimum and maximum thread bound per cache level |
| $W$ 914 | Work package set that partitions the work |
| $w_i$ 916 | A work package of a number of vertices that are assigned together to a thread |

$$C_{V\,total,seq}(T,M) > \underbrace{\frac{C_{V\,total,para}(T,M)}{T}}_{1006} + \underbrace{\frac{C_{T\,overhead} \cdot T}{|V|}}_{1008} \quad (10)$$

$$\underbrace{|V_{min\,for\,parallel}|}_{} = \frac{C_{T\,min} + \overbrace{C_{para\,startup}}^{1004}}{C_{V\,total}(T=1,M)} \quad (9) \;\substack{\curvearrowleft \\ 1002}$$

$\substack{\curvearrowleft \\ 1000}$

FIG. 10A

```
1  minNotSet ← true
2  T_min ← 0
3  T_max ← 0
4  for {T | 1 ≤ T ≤ P, T = 2^n, n ∈ ℕ_0} do
5      J_max = MAX(T, |V|·C_v total(T,M) / (C_T min + C_para startup))
6      J_min = (|V|·C_v total(T,M) + J_max·C_T overhead) / (|V|·C_v total,seq(M))     ▷ conditions that must be fulfilled
7      if T_max ≤ J_min then break
8      if J_max > J_min then
9          T_max ⇐ J_max
10         if minNotSet then
11             T_min ⇐ J_min
12             minNotSet ⇐ false
13     else if ¬minNotSet then break
```

FIG. 10B $$M_{Counters} = sizeof(counter) \cdot |V| \quad (11)$$

$$S(M) = \frac{log(M_l) - log(M)}{log(M_l) - log(M_u)} \quad (12)$$

$$\delta L(T, l) = L(M_u, T) - L(M_l, T) \quad (13)$$

$$L_{predict} = L(M_l, T) - \delta L(T) \cdot S(M)^3 \quad (14)$$

FIG. 11A

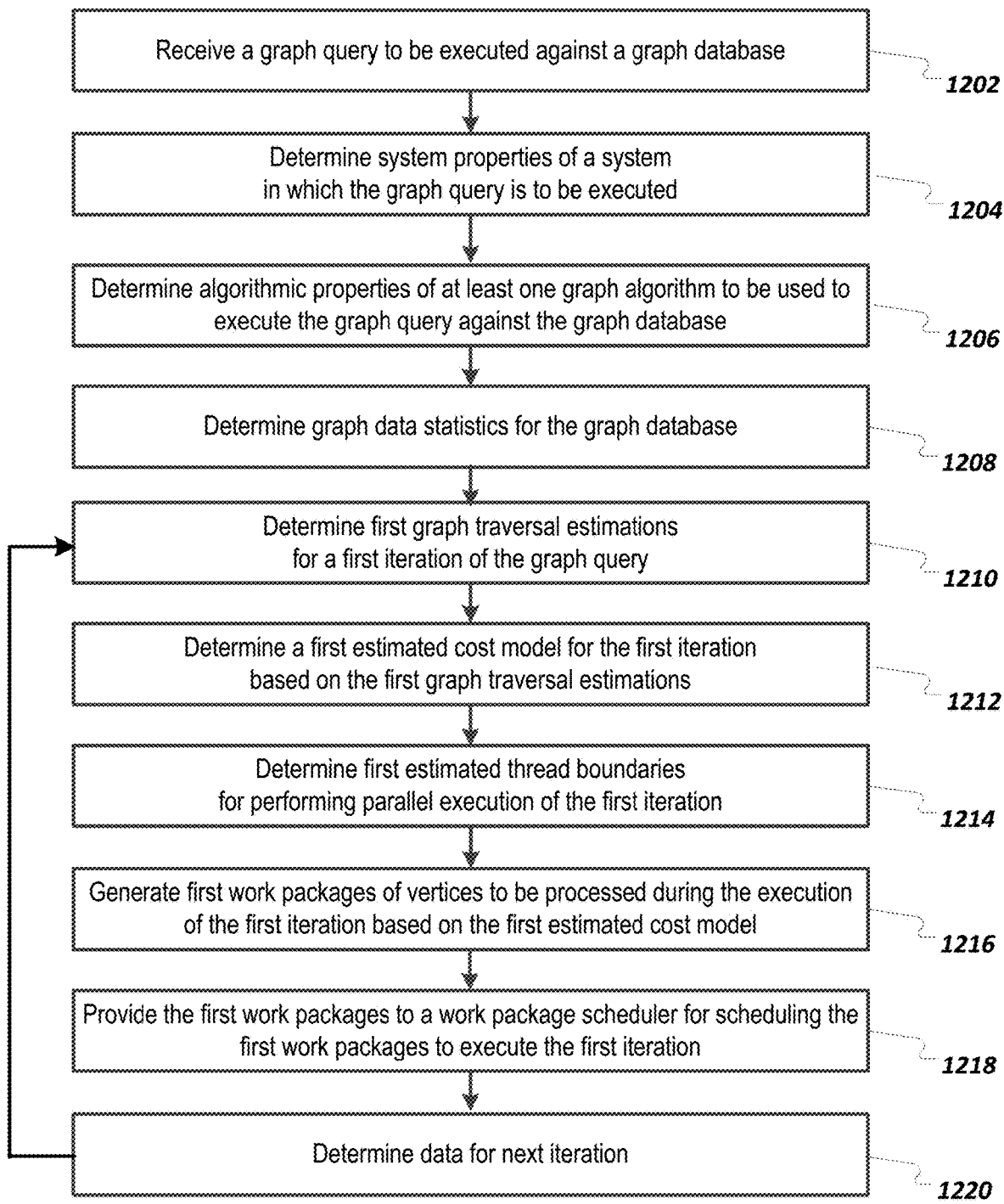
FIG. 12    1200

CONFIGURING GRAPH QUERY PARALLELISM FOR HIGH SYSTEM THROUGHPUT

TECHNICAL FIELD

The present disclosure relates to computer-implemented methods, software, and systems for configuring graph query parallelism for high system throughput.

BACKGROUND

A graph database is a type of database that uses vertices and edges to represent and store data. A graph database can be used for many different types of problem domains. For example, graph databases can be used to store data for social, business, traffic, biology or other natural sciences applications. A graph database can store information about connected entities. An entity can be represented in the graph as a vertex. A connection (e.g., relationship) between entities can be represented in the graph as an edge between two vertices.

SUMMARY

The present disclosure involves systems, software, and computer implemented methods for configuring graph query parallelism for high system throughput. An example method includes: receiving a graph query to be executed against a graph database; determining system properties of a system in which the graph query is to be executed; determining algorithmic properties of at least one graph algorithm to be used to execute the graph query against the graph database; determining graph data statistics for the graph database; and for a first iteration of the graph query: determining first graph traversal estimations for the first iteration; determining a first estimated cost model for the first iteration based on the first graph traversal estimations; determining first estimated thread boundaries for performing parallel execution of the first iteration; generating first work packages of vertices to be processed during the execution of the first iteration based on the first estimated cost model; and providing the first work packages to a work package scheduler for scheduling the first work packages to execute the first iteration.

Implementations can include one or more of the following features. The work package scheduler can determine which of the first work packages are executed in parallel and which of the first work packages are executed sequentially. A next set of vertices to process in a second iteration can be determined and second graph traversal estimations, a second cost model, and second estimated thread boundaries for the second iteration can be determined. Second work packages can be generated for the second iteration and provided to the work package scheduler. The first estimated cost model can be used for the second and subsequent iterations and the second cost model is not determined for the second iteration. Generating the work packages can include creating a set of work packages that each have a substantially similar cost. The system properties can include cache sizes and memory access times. The algorithmic properties can include memory consumption and amount of memory accessed by atomic and non-atomic operations. The graph data statistics can include vertex degrees and vertex degree distribution information. The estimated graph traversal information can include estimates for number of newly-visited vertices and number of touched vertices for the first iteration. When algorithmic properties are determined for more than one graph algorithm, a first estimated cost model can be determined for each graph algorithm and a graph algorithm with a lowest first estimated cost model can be selected for further evaluation.

While generally described as computer-implemented software embodied on tangible media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

FIG. 4 is a table that includes information about parameters for traversal behavior estimation.

FIG. 5 illustrates equations for estimating counts of touched vertices.

FIG. 6 illustrates equations for estimating counts of newly found vertices.

FIG. 7 is a table that includes information about cost model parameters.

FIG. 8 illustrates equations related to cost estimation.

FIG. 9 is a table that includes information about parameters for work package and thread boundaries estimation.

FIG. 10A illustrates equations related to work package generation and thread boundary estimation.

FIG. 10B illustrates an algorithm that can be performed to produce a time-efficient solution to the optimization problem for computing thread boundaries.

FIG. 11A illustrates equations for modeling update contention.

FIG. 12 is a flowchart of an example method for configuring graph query parallelism for high system throughput.

DETAILED DESCRIPTION

Figure 1:
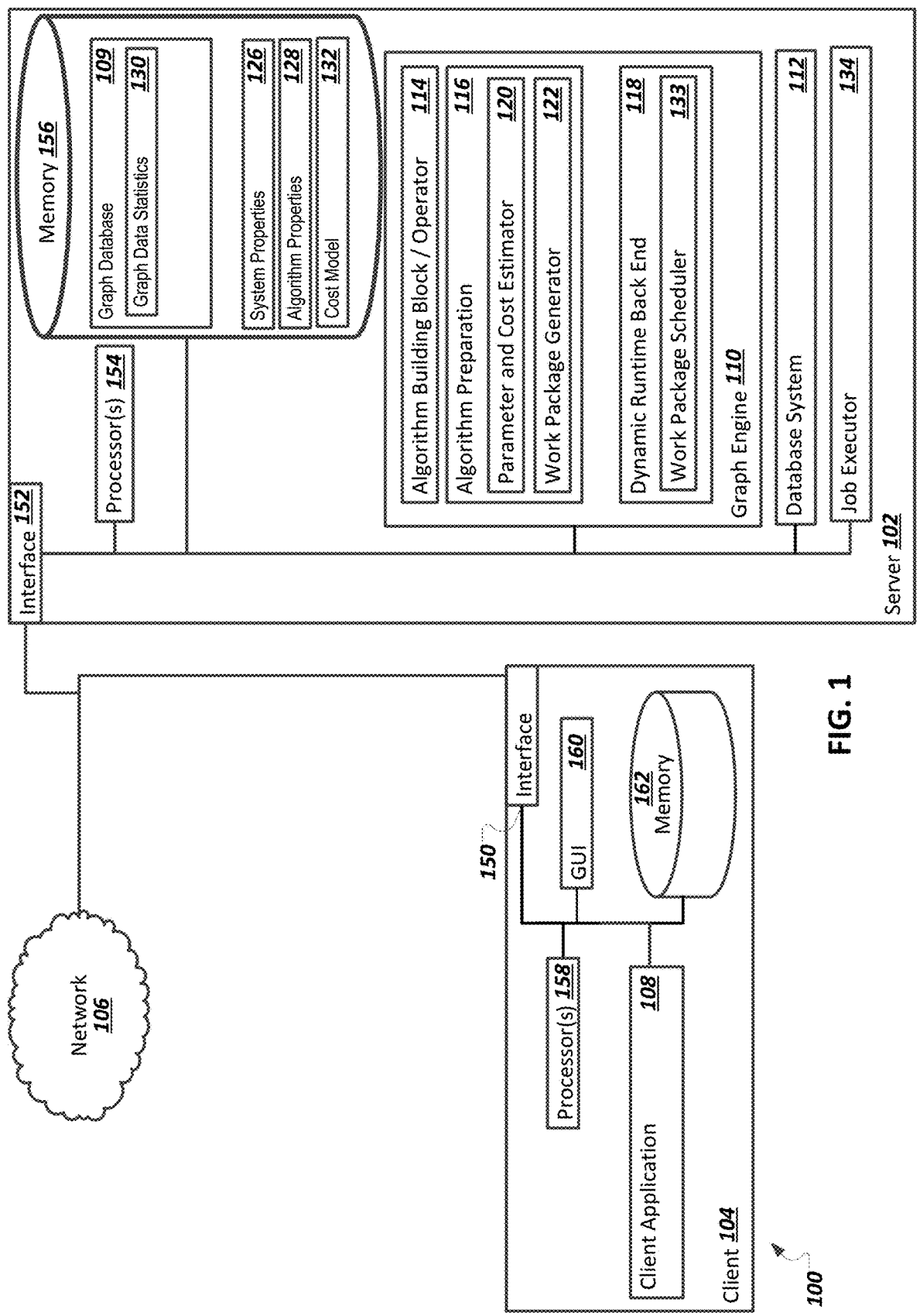
FIG. 1 is a block diagram illustrating an example system for configuring graph query parallelism for high system throughput.

Graph based data sets can be used to manage vast amounts of data for various types of applications, such as social networks, financial networks, traffic networks, and biology or other natural science applications. Graph based data sets can include, for example, thousands or even billions of vertices and edges. Applications that utilize a graph database may perform various types of queries, such as larger, more complex queries or smaller, less complex queries, either interactively or as batch jobs. For instance, a graph-based application such as a route prediction service for road networks may operate on relatively smaller graphs, but may process a larger number of concurrent queries as compared to other applications.

Graph processing can be inherently complex, since data sets can substantially differ and different types of graphs can be used. For example, scale-free graphs can have a power-law-based degree distribution with a long tail, such as for social networks, while other graphs can exhibit a relatively constant degree among most or all vertices, such as for road networks or electrical power grids. Furthermore, the behavior of different graph algorithms can be fundamentally different. For instance, some algorithms (e.g., breadth-first search (BFS) algorithms) can operate on a relatively small subset of the overall graph at a given point in time, while other algorithms (e.g., page rank (PR) algorithms) can operate more frequently on a complete graph. Additionally, performance objectives of graph applications may vary. For example, if only single queries are processed, latency may be a key performance metric. As another example, for other applications which perform a larger amount of concurrent queries, throughput may be a key performance metric.

Given the various aspects and complexities of graph databases, it can be difficult to implement high-performance graph computations. Improving performance of either multi-query or single query processing can be difficult. Single query optimizations can include algorithm selection (e.g., push or pull) and parallelization (e.g., multi-threading for faster processing). However, selecting a best algorithm or configuring parallelization to achieve performance gains may be challenging before queries are actually executed, for example, due to the algorithm and data set differences mentioned above. Additionally, optimizations can result in additional overhead, such as instance synchronization for parallel execution. Overhead may diminish performance gains or even result in lower performance. Optimizations such as NUMA (Non-Uniform Memory Access) awareness and code generation may reduce but likely will not completely remove overhead. For multi-query execution (e.g., concurrent queries), complexity is further increased as concurrent queries need to be scheduled and amounts of queries to be executed concurrently need to be configured.

With graph processing, increasing a number of threads can increase performance. However, if too many threads are created (e.g., beyond a "sweet spot" number of threads), contention for same data items among multiple threads can occur, which can decrease performance. Contention can occur, for example, when a given vertex may be visited from multiple other vertices. Different threads, each processing one of the multiple other vertices, may each want to visit the given vertex at a same time, resulting in contention. As another example, too many threads might result in work packages that are too small to compensate for overhead costs, thus harming rather than improving performance.

Graph database performance can be improved by automatically controlling a degree of parallelization during multi-query execution. Although multi-query execution is described, intra-query parallelism can also be controlled for single query execution. Controlling multi-query parallelization for graph databases can result in improved system utilization, lower synchronization cost, and efficiencies gained from a higher degree of concurrent execution. Automatically controlling multi-query parallelism can include: (1) sampling of vertices to determine graph statistics; (2) deriving parallelization constraints from algorithm and system properties; and (3) generating work packages of suitable sizes based on the graph statistics and the parallelization constraints. The multi-query parallelization approach can improve performance for different types of queries and different data sets with low overhead. Additionally, performance achieved through automatic multi-query parallelism can be more significant than performance achieved through manual optimization approaches.

For instance, overhead can be reduced, as compared to other approaches, by use of efficient generation of statistics and cost models. For example, a cost estimator model can incorporate traversal behavior estimators (e.g., based on an estimated new vertex set and estimated memory access). Overhead that may be incurred can be outweighed by resulting improvement of query execution. For instance, efficient methods can be used that result in minimal overhead during execution but that are accurate enough for good scheduling decisions. With the improved approach, resulting query execution efficiency can be increased, with an increased number of accumulated operations per time unit, for a variety of scenarios, such as for different types of graph data (e.g., data size, data type), different algorithms (e.g., local, non-local), and different types of concurrency (e.g., single-query or multi-query execution). In summary, the improved approach can include design and implementation of a runtime resource control system that schedules graph queries during execution based on latency-aware parallelization, cost-based work packaging, and selective sequential execution. The improved approach can be used for different types of algorithms, such as different BFS or PR algorithms, and for different amounts of concurrency.

FIG. 1 is a block diagram illustrating an example system 100 for configuring graph query parallelism for high system throughput. Specifically, the illustrated system 100 includes or is communicably coupled with a server 102, a client device 104, and a network 106. Although shown separately, in some implementations, functionality of two or more systems or servers may be provided by a single system or server. In some implementations, the functionality of one illustrated system, server, or component may be provided by multiple systems, servers, or components, respectively.

A client application 108 running on the client device 104 can send a query to the server 102 to query a graph database 109. A graph engine 110 can process the query. As described in more detail below, the graph engine 110 can intelligently configure parallel execution of the query (e.g. intra query parallelism) as well as inter-query parallelism.

The graph engine 110 can be designed to achieve three main goals: 1) efficient system utilization; 2) synchronization cost reduction; and 3) concurrent execution efficiency. As described in more detail below with respect to FIGS. 2-3, the graph engine 110 can use different techniques to achieve these goals, including: (1) latency-aware parallelization; (2) cost-based work packaging; and (3) selective sequential execution. Additionally, the graph engine 110 can be designed for predictable behavior so that small changes (e.g., in a number of vertices or edges) between queries does not result in significantly higher or lower performance. The graph engine 110 can be configured to perform work in parallel such that parallel execution is faster than a sequential processing alternative. The graph engine 110 can be configured to share resources with other engines that may be configured. For example, the graph engine 110 may be part of a database system 112 and the database system 112 may have other running components, such as a relational engine. Accordingly, the graph engine 110 can be configured so as to not utilize all system resources (e.g., so that other processing of the database system 112 is not unacceptably adversely affected).

Graph computational iterations can have small elapsed times. Accordingly, computations that are employed by the graph engine 110 to predict behavior during execution can have a low overhead so that the time used for prediction is an acceptable portion (e.g., a small fraction) of the elapsed time of an iteration of a graph computation. The graph engine 110 can generate acceptable predictions while having the low, acceptable overhead.

In further detail, the graph engine 110 includes an algorithm building block/operator component 114, an algorithm preparation component 116, and a dynamic runtime backend component 118. The algorithm building block/operator component 114 can be used for graph operations such as for BFS and/or page rank approaches, and can be used for multiple iterations of an algorithm.

The algorithm preparation component 116 can be used to determine (e.g., preselect) useful parameters in a preparation phase based on available data and assumptions. Algorithm preparation includes parameter and cost estimation performed by a parameter and cost estimator 120 and work package generation performed by a work package generator 122. Algorithm preparation can be performed for each iteration of an algorithm. Different types of algorithms can be executed, such as breadth-first-search and page-rank algorithms. The parameter and cost estimator 120 can generate cost estimates using system properties 126, algorithm properties 128, and graph data statistics 130, when building a cost model 132. The system properties 126, algorithm properties 128, graph data statistics 130, and generating a cost model are described in more detail below.

For latency-aware parallelization, a performance model for graph traversal algorithms can be applied by the parameter and cost estimator 120 when determining system parameters, such as a number of threads to use for parallel processing. Different numbers of threads may be optimal in terms of performance depending on the primitive operations performed by an algorithm and the size of intermediate data. As mentioned above, parallel execution may in some cases harm performance. Accordingly, the parameter and cost estimator 120 can use the cost model 132 to determine an upper and lower bound for parallel execution of a specific query.

The work package generator 122 can generate work packages of suitable sizes of vertices to be processed together, based on the graph data statistics 130 and the thread number constraints generated by the parameter and cost estimator 120. That is, the work package generator 122 can generate packages given an upper thread boundary and cost, from the cost and parameter estimation process. Given the vertices to be processed in an iteration, the cost model includes an estimated cost per vertex. The work package generator 122 can generate work packages that have substantially a same cost.

The dynamic runtime backend component 118 includes a work package scheduler 133 that schedules work packages that are received from the work package generator 122. The work package scheduler 133 can schedule work packages for execution by a job executor 134. For example, work package(s) can be assigned to threads. A thread can then perform processing on a subset of vertices processed during a query iteration. As described in more detail below, the work package scheduler 133 can control execution of a core graph algorithm and can handle conditions that are unknown prior to execution of the core graph algorithm.

As used in the present disclosure, the term "computer" is intended to encompass any suitable processing device. For example, although FIG. 1 illustrates a single server 102, and a single client device 104, the system 100 can be implemented using a single, stand-alone computing device, two or more servers 102, or two or more client devices 104. Indeed, the server 102 and the client device 104 may be any computer or processing device such as, for example, a blade server, general-purpose personal computer (PC), Mac®, workstation, UNIX-based workstation, or any other suitable device. In other words, the present disclosure contemplates computers other than general purpose computers, as well as computers without conventional operating systems. Further, the server 102 and the client device 104 may be adapted to execute any operating system, including Linux, UNIX, Windows, Mac OS®, Java™, Android™, iOS or any other suitable operating system. According to one implementation, the server 102 may also include or be communicably coupled with an e-mail server, a Web server, a caching server, a streaming data server, and/or other suitable server.

Interfaces 150 and 152 are used by the client device 104 and the server 102, respectively, for communicating with other systems in a distributed environment—including within the system 100—connected to the network 106. Generally, the interfaces 150 and 152 each comprise logic encoded in software and/or hardware in a suitable combination and operable to communicate with the network 106. More specifically, the interfaces 150 and 152 may each comprise software supporting one or more communication protocols associated with communications such that the network 106 or interface's hardware is operable to communicate physical signals within and outside of the illustrated system 100.

The server 102 includes one or more processors 154. Each processor 154 may be a central processing unit (CPU), a blade, an application specific integrated circuit (ASIC), a field-programmable gate array (FPGA), or another suitable component. Generally, each processor 154 executes instructions and manipulates data to perform the operations of the server 102. Specifically, each processor 154 executes the functionality required to receive and respond to requests from the client device 104, for example.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, JavaScript®, Visual Basic, assembler, Perl®, any suitable version of 4GL, as well as others. While portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

The server 102 includes memory 156. In some implementations, the server 102 includes multiple memories. The memory 156 may include any type of memory or database module and may take the form of volatile and/or non-volatile memory including, without limitation, magnetic media, optical media, random access memory (RAM), read-only memory (ROM), removable media, or any other suitable local or remote memory component. The memory 156 may store various objects or data, including caches, classes, frameworks, applications, backup data, business objects, jobs, web pages, web page templates, database tables, database queries, repositories storing business and/or dynamic information, and any other appropriate information including any parameters, variables, algorithms, instructions, rules, constraints, or references thereto associated with the purposes of the server 102.

The client device 104 may generally be any computing device operable to connect to or communicate with the server 102 via the network 106 using a wireline or wireless connection. In general, the client device 104 comprises an electronic computer device operable to receive, transmit, process, and store any appropriate data associated with the system 100 of FIG. 1. The client device 104 can include one or more client applications, including the client application 108. A client application is any type of application that allows the client device 104 to request and view content on the client device 104. In some implementations, a client application can use parameters, metadata, and other information received at launch to access a particular set of data from the server 102. In some instances, a client application may be an agent or client-side version of the one or more enterprise applications running on an enterprise server (not shown).

The client device 104 further includes one or more processors 158. Each processor 158 included in the client device 104 may be a central processing unit (CPU), an application specific integrated circuit (ASIC), a field-programmable gate array (FPGA), or another suitable component. Generally, each processor 158 included in the client device 104 executes instructions and manipulates data to perform the operations of the client device 104. Specifically, each processor 158 included in the client device 104 executes the functionality required to send requests to the server 102 and to receive and process responses from the server 102.

The client device 104 is generally intended to encompass any client computing device such as a laptop/notebook computer, wireless data port, smart phone, personal data assistant (PDA), tablet computing device, one or more processors within these devices, or any other suitable processing device. For example, the client device 104 may comprise a computer that includes an input device, such as a keypad, touch screen, or other device that can accept user information, and an output device that conveys information associated with the operation of the server 102, or the client device 104 itself, including digital data, visual information, or a GUI 160.

The GUI 160 of the client device 104 interfaces with at least a portion of the system 100 for any suitable purpose, including generating a visual representation of the client application 108. In particular, the GUI 160 may be used to view and navigate various Web pages, or other user interfaces. Generally, the GUI 160 provides the user with an efficient and user-friendly presentation of business data provided by or communicated within the system. The GUI 160 may comprise a plurality of customizable frames or views having interactive fields, pull-down lists, and buttons operated by the user. The GUI 160 contemplates any suitable graphical user interface, such as a combination of a generic web browser, intelligent engine, and command line interface (CLI) that processes information and efficiently presents the results to the user visually.

Memory 162 included in the client device 104 may include any memory or database module and may take the form of volatile or non-volatile memory including, without limitation, magnetic media, optical media, random access memory (RAM), read-only memory (ROM), removable media, or any other suitable local or remote memory component. The memory 162 may store various objects or data, including user selections, caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the client device 104.

There may be any number of client devices 104 associated with, or external to, the system 100. For example, while the illustrated system 100 includes one client device 104, alternative implementations of the system 100 may include multiple client devices 104 communicably coupled to the server 102 and/or the network 106, or any other number suitable to the purposes of the system 100. Additionally, there may also be one or more additional client devices 104 external to the illustrated portion of system 100 that are capable of interacting with the system 100 via the network 106. Further, the term "client", "client device" and "user" may be used interchangeably as appropriate without departing from the scope of this disclosure. Moreover, while the client device 104 is described in terms of being used by a single user, this disclosure contemplates that many users may use one computer, or that one user may use multiple computers.

Figure 2:
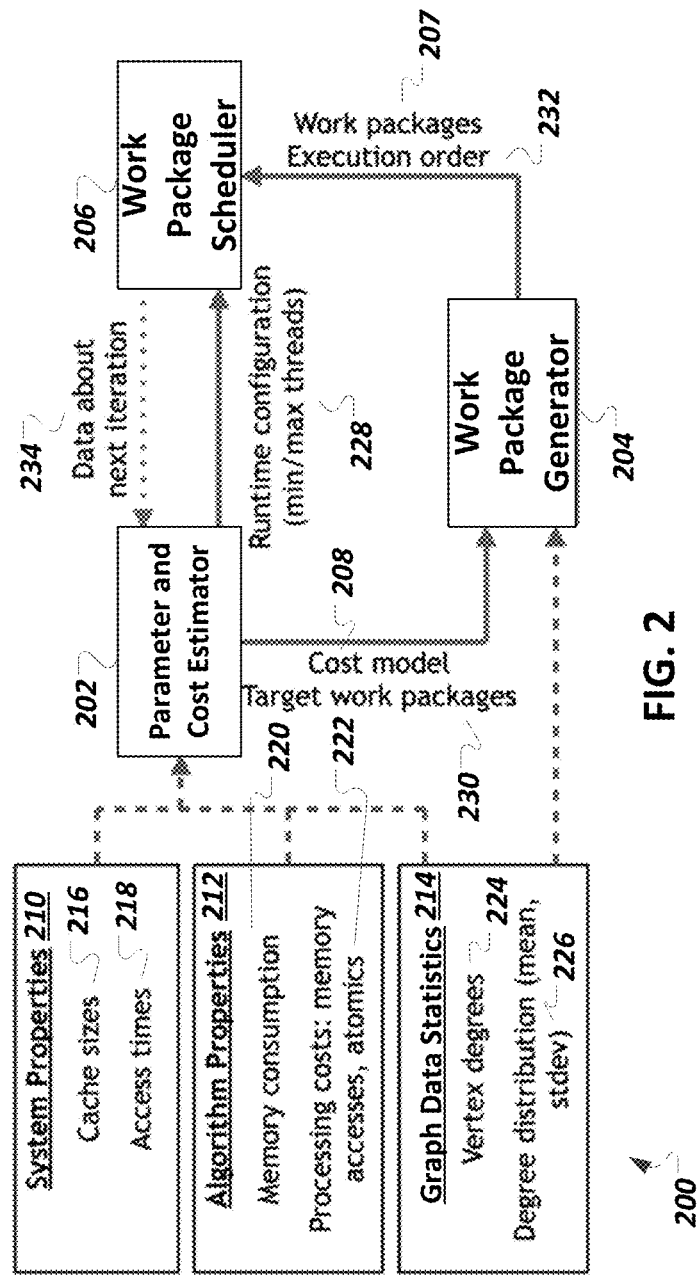
FIG. 2 illustrates an example system that shows interactions between a graph processing engine and scheduler components.

FIG. 2 illustrates an example system 200 that shows interactions between graph processing engine and scheduler components. The system 200 illustrates how the result from operations at one component is used in a succeeding component, and how certain boundaries are set. FIG. 2 also illustrates which properties of system, algorithm, and data are taken into consideration by which subcomponent. In FIG. 2, different types of lines highlight the flow of information between components, with dashed lines highlighting access to upfront prepared data, solid lines highlighting data flow between components, and dotted lines highlighting data for next iterations.

In further detail, a preparation operation performed by a parameter and cost estimator 202 (which can be the parameter and cost estimator 120 of FIG. 1) generates information for latency-aware parallelization and therefore about a most-suitable execution mode. Cost-based work packaging performed by a work package generator 204 (which may be the work package generator 122 of FIG. 1) generates work packages that fulfill a goal of equal work distribution with a sufficient amount of work per package. A work package scheduler 206 (which can be the work package scheduler 133 of FIG. 1) can use work package information 207 received from the work package generator 204 for scheduling work packages, either in parallel or, in some cases, with selective sequential execution. For instance, the work package scheduler 206 can take into account dynamic system behavior that is not considered by the parameter and cost estimator 202 or the work package generator 204.

In further detail, the parameter and cost estimator 202 can generate a cost estimation using a cost model 208 that incorporates system properties 210, algorithmic properties 212, and graph data statistics 214. System properties 210 can include, for example, cache sizes 216 and access times 218. Dynamic system properties like the access times 218 can be determined prior to experiments using a degree count benchmark. Similarly, static system properties such as the cache sizes 216 can also be determined prior to experiments using appropriate tools such as a CPU analyzer tool.

The algorithmic properties 212 can include, for example, memory consumption information 220 and processing costs 222. Algorithmic properties 212 can be obtained by counting, for example, by a query compiler, respective operations and touched memory. The graph data statistics 214 can include, for example, information about vertex degrees 224 and degree distribution 226.

The parameter and cost estimator 202, as part of a latency-aware parallelization approach, can generate parameters to be used by other components. For example, the parameter and cost estimator 202 can generate thread boundaries 228 (e.g., a minimum and maximum number of threads) to be provided as runtime configuration information to the work package scheduler 206. As another example, the parameter and cost estimator 202 can determine a target number of work packages 230, to be provided to the work package generator 204.

While latency-aware parallelization tries to provide optimal parameters, such as thread count bounds for parallel execution and number of work packages, cost-based work packaging performed by the work package generator 204 involves optimizing the work packages. On a large scale, the average degree and the related work of sets of vertices can be described statistically. But if the variance of the edge degrees is high, or the number of vertices in a partition is small, the potential work per partition might be non-uniformly distributed between different partitions, resulting in inefficiencies due to the bulk-synchronous execution. Accordingly, some work packages may take much longer than others. To address the problem of non-uniform distribution of work between packages, input data statistics (e.g., the graph data statistics) can be used. For instance, for cases with a high vertex degree variance and a low numbers of vertices, work packages can be generated that are based on a vertex and edge performance model, in which vertices are iterated over and the out degree of vertices are obtained until a work share is exceeded for a particular work package. A number of work packages can be limited to a predefined multiple (e.g., 8 times) of the maximum usable level of parallelism to avoid over-parallelization and resulting effects such as contention. Additionally, work packages can be ordered (e.g., in an execution order 232) so that work packages with a high cost (e.g., due to a single dominating vertex) are executed first. For cases where the number of vertices is high or the variance is low, for efficiency reasons, a static partitioning can be used (e.g., of equally-sized partitions). In general, the number of work packages is much larger than the used number of cores, which allows the runtime to react on dynamic execution behavior.

While the work page generator 204 can generate intelligently-sized work packages, the work package generator 204, since not operating at runtime, cannot address runtime effects such as the dynamic aspect of contention. The work package scheduler 206, however, can be configured to deal with these dynamic aspects and to handle the fact that in some cases sequential execution may be more efficient than parallel execution. The work package scheduler 206 performs, for example, the following functions: 1) assigning of work to worker threads; and 2) controlling if the work is executed sequentially or in parallel. When the execution of a task starts, the work package scheduler 206 requests worker threads from the system according to the upper thread boundary. When a worker thread gets assigned, the worker thread registers itself with the work package scheduler 206 and requests a work package. The work package scheduler 206 checks if the number of registered worker threads is higher than the minimum boundary for parallel execution. If the number of registered worker threads is higher than the minimum boundary for parallel execution, the work package scheduler 206 assigns a work package to the registered worker threads for parallel execution. If the number of registered worker threads is not higher than the minimum boundary for parallel execution, the work package scheduler 206 assigns one worker thread to execute a package sequentially, while the other worker threads wait until the package is completed. Then, the work package scheduler 206 reevaluates the worker thread situation. This is repeated for a limited number of sequential packages after which the work package scheduler 206 releases all but one worker thread and completes the execution sequentially. This approach avoids a central scheduler that needs to deal with many different tasks which might run a very short time and might be of different types, such as relational and graph tasks. The work package scheduler 206 also executes the tasks using an optimal parallelism strategy, taking into account concurrently-executed tasks. Especially for scenarios with concurrent queries, the work package scheduler 206 can schedule to prefer sequential execution of a single query over parallel execution of a single query, to avoid over-parallelization.

The work package scheduler 206 schedules packages for a current iteration of the query. In some implementations, the work package scheduler 206 provides data about (e.g., for) a next iteration 234. For example, the next set of vertices to be processed in the next iteration can be provided to the parameter and cost generator 202, for generation of a next code model and next parameters for the next iteration. As another example, actual measured performance costs of execution of the current iteration can be provided to the parameter and cost estimator 202, and, in some implementations, the parameter and cost estimator 202 can use the current iteration performance information for generating next estimates.

Figure 3:
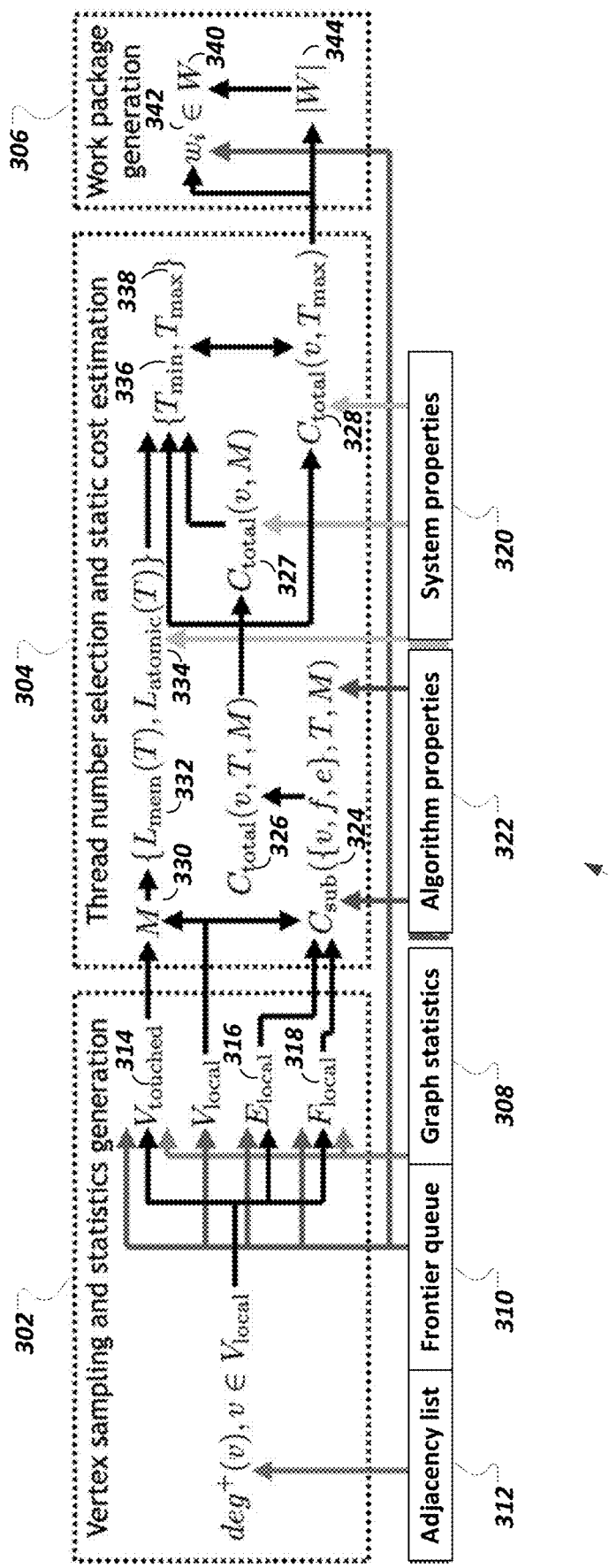
FIG. 3 illustrates an example system that shows interactions between statistical values, estimations and work package generation.

FIG. 3 illustrates an example system 300 that shows interactions and dependencies between statistical values, estimations, and work package generation. The system 300 includes a vertex sampling and statistic generation portion 302, a thread number selection and static cost estimation portion 304, and a work package generation portion 306. The vertex sampling and statistic generation portion 302 includes details for estimators that can approximate the size of certain vertex sets. The thread number selection and static cost estimation portion 304 can include details for estimating static costs per vertex, including use of a cost model for processing vertices and criteria for determining a number of threads (which may be limited by determined thread boundaries) to use for processing those vertices. The work package generation portion 306 includes details for generating work packages.

The vertex sampling and statistics generation portion 302 can include generation of graph statistics 308 based on a frontier queue 310 that includes all of the vertices that may be processed and an adjacency list 312. Specific graph statistics 308 are described in more detail below with respect to FIG. 4. Vertex sampling and statistics generation can vary based on a type of graph algorithm. For example, for topology-centric algorithm such as page rank, where the vertices stay the same for all iterations, pre-processing of statistics generation and vertex sampling can be performed once, up front. As another example, for data-driven algorithm such as breadth-first algorithms, the pre-processing can be performed for every iteration as for every iteration a different set of vertices may be processed.

Good statistical data related to the vertices to be processed can be desired, since the vertices, their related degree and the related work can vary between iterations. Global statistics generation can be performed so as to keep overhead to an acceptable level. An inexpensive way to gather statistical data is to collect statistics at creation time from the index data structure for the graph topology (e.g., the adjacency list 312). Here, statistics for edges and vertices can be gathered and stored, including the mean and maximum vertex out degrees. $V_{touched}$ 314, $E_{local}$ 316, and $F_{local}$ 318 can be derived, as described below. $F_{local}$ 318 can also be referred to as $V_{new}$, e.g., vertices that are newly found after each iteration.

At run time, a determination can be made as to whether the global statistics are to be used for cost estimation or if local statistics are to be computed and used for the current iteration. The determination can be based on a ratio of maximum vertex degree to mean vertex degree, as a variance metric that reflects variance. The variance metric can be compared to a threshold. For instance, from experimentation, a threshold of 1.1 can be determined to be effective as a variance threshold. If the variance metric is below the threshold (e.g., low variance) then the cost estimation can use the global statistics. If the variance metric is above the threshold (e.g., high variance), then local statistics can be computed and used. For example, $|V_{touched}|$ and $|V_{new}|$ values can be computed on a subset of current data (e.g., up to the first 4,000 vertices) using real vertex degrees, and global values can be extrapolated from the subset. The computation of local statistics can be parallelized to minimize overhead.

For graph traversal algorithms, the number of starting vertices and processed edges are typically important cost factors. For cost modeling, two important factors are the number of first time newly visited vertices ($|V_{new}|$) and the number of vertices that will be touched in the next iteration ($|V_{touched}|$). The to-be-visited vertices are directly related to the found vertices, while touched vertices relate to the amount of memory that is shared, such as duplicate filters during a graph traversal. Graph processing can involve traversal operations that traverse a graph from vertex to vertex, using connected edges. The touched vertices are vertices that have been visited already from another vertex. The new found vertices are vertices that are newly visited in each iteration of the graph traversal.

Obtaining exact $V_{new}$ and $V_{touched}$ values would require executing the graph algorithm. Rather than executing the algorithm, estimations can be performed in which whether a vertex is visited or touched is modeled using a conditional probability process. A model for estimating traversal behavior can be based on a general assumption that the probability for all vertices to be visited by an edge is identical. Other assumptions for the model that follow include assuming that none of the following apply: 1) a correlation between different vertices; 2) structural effects like a rich club effect (e.g., level-dependent); or the graph being a multigraph (e.g., with increased probability for some vertices).

FIG. 4 is a table 400 that includes information about parameters for traversal behavior estimation. A parameter V 402 represents all vertices in the graph. A parameter $V_{touched}$ 404 represents vertices that are touched via edges. A parameter $V_{new}$ 406 represents vertices that are newly found after each iteration. A parameter $V_{reach}$ represents vertices that are reachable via a graph traversal (e.g., vertices that are neither isolated nor without an incoming edge). A parameter $V_{local}$ 410 represents a set of vertices in the current (local) queue. A parameter $F_{local}$ 412 represents a set of found vertices. As mentioned, $F_{local}$ 412 can correspond to $V_{new}$ 406. A parameter $E_{local}$ 414 represents a set of vertex edges for the local queue $V_{local}$. A parameter $P_{v\ visits}$ 416 represents a probability that a vertex will be visited by a vertex v. A parameter $V_{no\ visit}$ 418 represents vertices that have not been visited before. A parameter $P_{no\ visit}$ 420 represents a probability that a vertex has not been visited.

FIG. 5 illustrates equations 500 for estimating counts of touched vertices. An Equation (1) 502 illustrates that an estimation for $|V_{touched}|$ 504 can be based on a probability for a reachable vertex to be reached at least once from a vertex from a frontier queue $v \in V_{queue}$ 506, aggregated for a set of all reachable vertices $V_{reach}$ 508.

Based on an assumption that the graph is not a multigraph and that each outgoing edge of a given vertex v is connected to another vertex, the probability for a specific vertex to be reached is $p_{v\ visits}$ 510. As illustrated in an Equation (2) 512, $p_{v\ visits}$ 510 can be calculated using calculation 514 of $$\frac{deg^+(v)}{|V_{reach}|},$$

with $deg^+$ (v) being the out degree of a vertex v.

In some instances, it can be too costly to compute the probability for each vertex of the frontier queue, as the queue can be of substantial size. To reduce the costs of computing a probability for each vertex, a difference between the maximum and mean value of outgoing edges per vertex can be used. If the difference between the maximum and mean value of outgoing edges per vertex is small (e.g., less than a threshold), the mean value can be used as an approximation, as illustrated in an Equation (3) 516. If the difference between the maximum and mean value of outgoing edges per vertex is not small (e.g., not less than the threshold), an extrapolation approach can be used that includes extrapolating the product of the probabilities from a sample of vertices in the queue at the beginning of each cost calculation. The sampling approach can use up to a predefined number of vertices (e.g., a first 8,192 vertices can be sampled). The predefined number can be selected to achieve a low latency and sufficient quality.

FIG. 6 illustrates equations 600 for estimating counts of newly found vertices. An Equation (4) 602, an Equation (5) 604, and an Equation (6) are similar to the Equation (1) 502, the Equation (2) 512, and the Equation (3) 516 described above with respect to FIG. 5. That is, for the estimation of $|V_{new}|$, a similar approach is used as for the estimation $|V_{touched}|$, but in addition to being reachable each specific vertex needs also to be unvisited. Accordingly, $P_{no\ visit}$ 608 is included in Equation (4) 602 and corresponding specific calculations 610 and 612 of $$\frac{|V_{no\ visit}|}{|V_{reach}|}$$

are included in Equation (5) 604 and Equation (6) 606, respectively.

Referring again to FIG. 3, for the thread number selection and static cost estimation portion 304, in order to model performance, an assumption can be made that the cost is proportional to the number of vertices $|V_{queue}|$ that have to be processed, the related edges e of these vertices that have to be traversed, and the new vertices $f \in V_{new}$ that are found as a result of this traversal. Using the estimations about traversal, different cost estimations can be calculated in the thread number selection and static cost estimation portion 304. For example, an estimate of an amount of memory that may be involved in the estimated traversals and operations can be determined.

In further detail, cost estimation be performed using a linear model that includes system properties 320, algorithmic properties 322, and the graph statistics 308 (e.g., statistics about the processed graph data). As mentioned, the system properties 320 can include cache sizes and memory access times. The algorithmic properties 322 can include an amount of touched data and the number of operations per edge and vertex, including computations, memory accesses, and atomic updates. For example, the algorithmic properties 322 can be used to determine $C_{sub}$ values 324 which each represent a sub cost for a given item (e.g., vertex or edge). $C_{total}$ values 326, 327, and 328 can be determined based on respective $C_{sub}$ values 324. The linear model can be used to estimate a resulting memory footprint M 330 that is used to determine the cache level the problem of the current traversal can fit into. A latency of the determined cache level can in turn be used as a parameter for a memory cost model $L_{mem}$ 332 (e.g., for non-atomic operations). Additionally, the determined cache level can be used to compute $L_{atomic}(T)$ values 334 using the related thread boundaries. $L_{atomic}(T)$ values 334 can represent an amount of atomic latency that depends on an amount of memory M.

Estimated thread boundaries 336 and 338 can be determined through interpolation, as described in more detail below. As the estimated thread boundaries 336 and 338 are worst cases, the system can work well with contention minimization techniques such as small local buffers even without adaptations. The thread number selection and static cost estimation portion 304 can involve use of other parameters and calculations, as described in more detail below.

FIG. 7 is a table 700 that includes information about cost model parameters. A parameter i 702 represents an item of generic type, including vertex (v), (new) found vertex (f) or edge (e). A parameter I 704 represents a set of items of a generic type, including a set of vertices in the current (local) queue ($V_{local}$), a set of found vertices ($F_{local}$), or a set of vertex edges for the local queue ($E_{local}$). A parameter $|I|$ 1706 represents a number of elements in a given set. A parameter T 708 represents a number of threads used. A parameter M 710 represents an amount of accessed data. A parameter $C_{sub}(i,T,M)$ 712 represents a sub-cost of execution for a given item (e.g., processing only a vertex v or f or an edge e). A parameter $C_{total}(v,T,M)$ 714 represents a total cost of parallel execution for a vertex v. A parameter $L_{op}$ 716 represents a latency of an arithmetic operation. A parameter $L_{mem}(M)$ 718 represents a latency of a non-atomic memory access, depending on the size M of the accessed data. A parameter $L_{atomic}(T,M)$ 720 represents a latency of an atomic operation, depending on the size M of the accessed data and the amount of threads T. A parameter $N_{ops}(i)$ 722 represents a number of arithmetic operations used to process item i. A parameter $N_{mem}(i)$ 724 represents a number of memory operations (e.g., non-atomic load and stores) used to process item i. A parameter $N_{atomics}(i)$ 726 represents a number of atomic operations used to process item i.

Regarding the $L_{atomic}$ parameter 720, an assumption can be made that parallel and sequential implementations are identical as the parallel code protects critical sections using atomic operations, while the sequential code can instead simply employ plain memory operations. This assumption can be modeled by setting the atomic update latency for a single thread $L_{atomic}(T=1, M)$ equal to the memory access latency $L_{mem}(M)$ 718, with both being dependent on the amount of accessed memory M 710.

Cost estimation can include three main cost subcomponents: 1) computations (e.g., operations), regular memory access operations (e.g. "mem") and atomic memory operations (e.g., atomics). A sub-cost $C_{sub}(i,T,M)$ 712 for the processing of a given item i can be computed, as described in more detail below.

FIG. 8 illustrates equations 800 related to cost estimation. An Equation (7) 802 illustrates computations for calculating $C_{sub}(i,T,M)$ 804 for a given item i. In order to compare the estimates for the parallel and the sequential cases, a total cost per vertex $C_{total}(T,M)$ 806 can be used, which can be calculated as illustrated in an Equation (8). The cost $C_{total}(T,M)$ 806 can be computed as a sum of the costs to process the vertex itself (e.g., equation portion 808), the cost of its share of edges (e.g., equation portion 810), and the newly found vertices (e.g., equation portion 812).

Referring again to FIG. 3, the work package generation portion 306 includes generation of a set of work packages W 340 that partitions work being parallelized, with respective work packages represented as $w_i$ 342. As described above, the work package generator can be provided a target work package count (e.g., $|W|$ 344). The value $|W|$ can be calculated as $$\min\left(|W_{max}|,\ \max\left(\left(\frac{C_{Total}}{C_{w\ min}}\right),\ 1\right)\right)$$

where $|W_{max}|$ is the maximum work package count.

FIG. 9 is a table 900 that includes information about parameters for work package and thread boundaries estimation. A parameter $C_{T\ overhead}$ 902 represents a start cost for a single thread. A parameter $C_{T\ min}$ 904 represents a minimum work per thread (e.g., that is larger than $C_{T\ overhead}$. A parameter $C_{para\ startup}$ 906 represents a start cost for parallel execution. A parameter P 908 represents a maximum number of cores. Parameters $T_{min}$ and $T_{max}$ 910 represent a minimum and maximum thread bound, respectively. Parameters $J_{min}$ and $J_{max}$ 912 represent a minimum and maximum thread bound per cache level, respectively. A parameter W 914 represents a work package set that partitions the work being parallelized. A parameter $w_i$ 916 represents a particular work package of a number of vertices that are assigned together to a thread.

FIG. 10A illustrates equations 1000 related to work package generation and thread boundary estimation. An Equation (9) 1002 illustrates computation of a $V_{min\ for\ parallel}$ value 1004 that can be determined based on the cost model. The $V_{min\ for\ parallel}$ value 1004 can be used to determine whether it is profitable to execute the algorithm code in parallel and for which thread ranges ($T_{min} \leq T \leq T_{max}$). For example, if the count of all vertices in the graph (e.g., $|V|$) is at least equal to the $V_{min\ for\ parallel}$ value 1004, then parallel execution can be profitable.

A minimum work per work package $C_{w\ min}$, a start cost for parallel execution $C_{para\ startup}$ 1004 and a start cost per thread $C_{T\ overhead}$ 1006 can be empirically determined, ensuring that the overhead remains reasonable in case of a high load.

The computation of the thread boundaries can be expensive, due to thread-count-dependent memory latency being non-linear. To compute thread boundaries, an optimization problem can be solved for a smallest number of threads ($T_{min}$) as shown in an Equation (10) 1008, under some side conditions.

FIG. 10B illustrates an algorithm 1050 that can be performed to produce a time-efficient solution to the optimization problem for computing thread boundaries. The algorithm 1050 includes code that iteratively doubles a number of threads and checks at each iteration if a valid upper and lower thread bound have been reached.

FIG. 11A illustrates equations 1100 for modeling update contention. While in some regards the compute cores of a multi-core system can be considered independent, in reality resources like a CPU (Central Processing Unit) internal interconnection network (e.g., system interconnect), cache hierarchies, or a memory controller can be shared among the cores. Furthermore, some modules can be limited in parallelism (e.g., banked caches), or require serialization (e.g., a memory controller). Typically a shared use of resources increases contention and thus the delay of a particular operation. As a result, the CPU has to wait longer until an operation like a memory access or a data transfer completes. An example case of resource contention is the use of a same memory address by multiple cores. Read-only access to a range of addresses causes virtually no contention as multiple shared copies of a given memory address can be installed in different caches. However, shared copies are not allowed in the case of a write access, thus write operations can result in a large amount of invalidations, subsequent cache misses, and ultimately, contention. Similar contention issues can apply to atomic operations like mutually exclusive read-modify-write operations, with contention occurring due to corresponding cache lines being locked during the operation and no other requests on the same cache line able to be served.

For memory-sensitive algorithms such as many graph algorithms, memory contention has a significant impact on overall performance. In general, there can be many sources on different levels that influence contention and its impact on the overall performance. For example, on a hardware level, there can be, for example, contention sources such as CPU cores, system interconnects, memory accesses, cache organization and the specification and implementation of atomic operations. On a software level, there can be lower-level contention sources such as thread-to-physical core mapping and higher-level sources such as algorithmic design. Push-based graph algorithms can be prone to contention due to updating of a same address. Pull-based algorithms are not generally prone to contention. Furthermore, the data that is being processed can be a source of contention.

Between the various different types of contention sources, complex interactions can exist that can be highly dynamic. In practice, the aforementioned contention sources can pose challenges for modeling contention and how contention affects latency and throughput of updates. However, to predict and optimize the performance of parallel graph algorithms, an accurate prediction of update performance is necessary.

A solution for predicting update performance can be to omit analytical modeling of contention, and instead create a model based on experiments and measurements. For example, a parametric model can be trained on a given system using a reference algorithm/problem and differently-sized data sets. Such a training can be performed (e.g., in at least a semi-automatic fashion) each time a new hardware configuration is used. Little's law can be applied for the parametric model by assuming that throughput and latency are interchangeable. For prediction of latency (e.g., during the cost estimation process described above) the prediction can be mapped to the reference problem. For a reference algorithm, degree count can be used, because degree count can be varied almost arbitrarily to model different scenarios. Furthermore, use of degree count can be comparable to many push-based graph algorithms. The reference algorithm can count the occurrence of vertex IDs of the vertex set V in an edge list, either as a source or target vertex, using fetch-and-add atomic operations on a single counter array. When executed in parallel, the input edge list can be partitioned in non-overlapping parts (e.g., of a predetermined size, such as 16 k edges each). If the partitioning results in fewer partitions than cores, we exclude this setting from the experiments. The partitions can be dynamically dispatched as work packages to a set of worker threads. The reference data set selected can be of a type that causes high contention and is a representative data set to real world applications. An appropriate and useful reference data set can be a synthetic data set generated using a recursive matrix (RMAT) approach, with a RMAT data set being representative of many graph problems. A scale-free degree distribution of RMAT graphs can cause high contention on vertices with high degree count. Furthermore, contention can vary with the number of vertices and the related counter array size, as memory accesses will be accordingly distributed.

For modeling update contention, two parameters can be examined: 1) the total number of threads; and 2) the amount of touched memory, which is the unique set of shared addresses accessed by any memory operation. To ensure that thread counts are representative with regard to later use in inference, a thread count used for experimentation can be the total number of threads successively divided by two, so that modeled thread counts are exponentially spaced. As illustrated in an Equation (11) 1102, with counter 1104 being a single counter of a counter array, an amount of touched memory, e.g., a counter array size $M_{Counters}$ 1106 can be computed as size of (counter)·$|V|$.

Figure 11B:
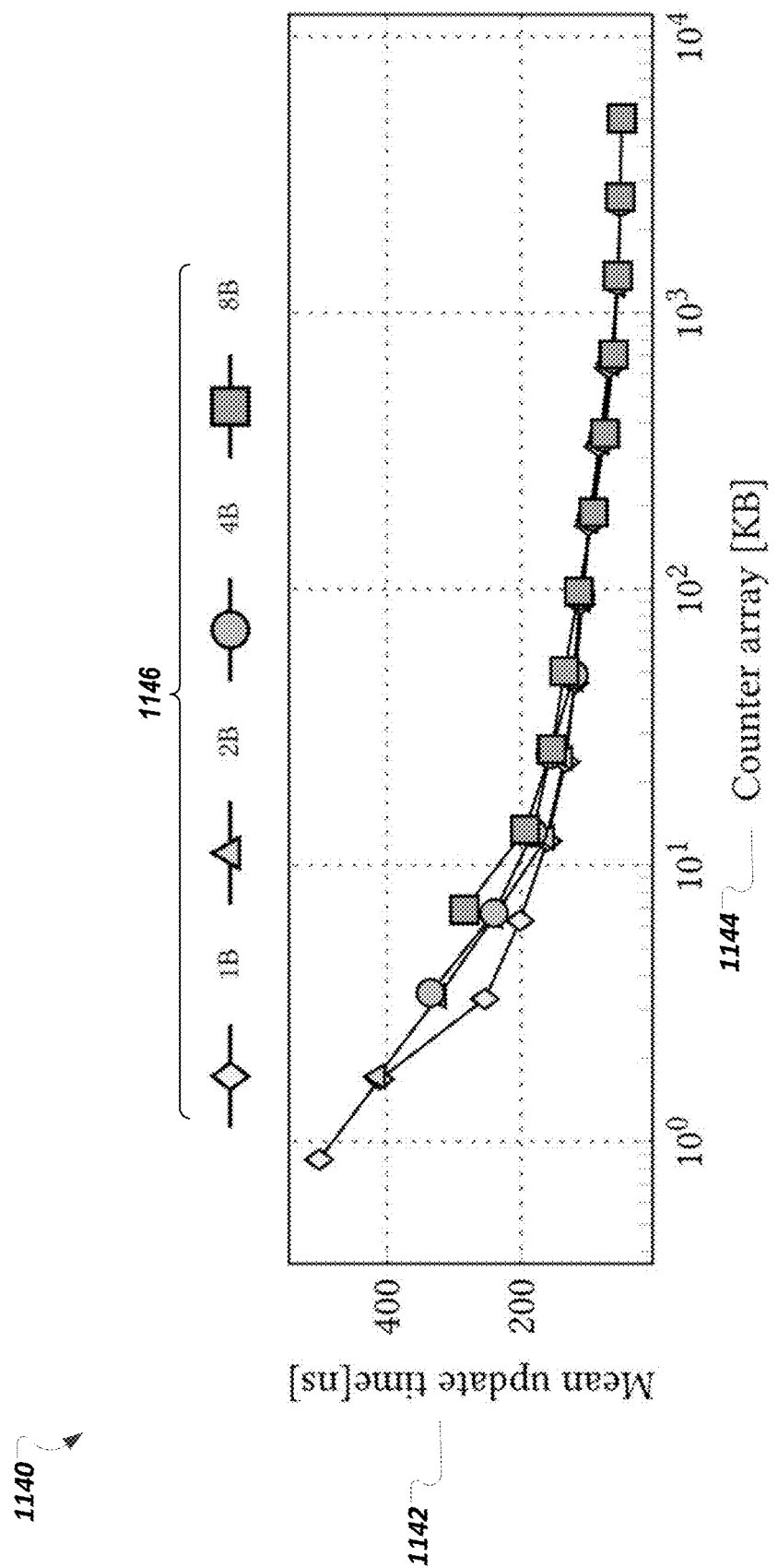
FIG. 11B is a graph that illustrates experimental results for modeling update time.

FIG. 11B is a graph 1140 that illustrates experimental results for modeling update time. The graph 1140 plots mean update time 1142 as a function of counter array size 1144 (e.g., a size parameter), with different data types 1146 for a counter, for a constant thread count T of 28. The experimental results illustrated in FIG. 11B show that update time is mainly a function of $M_{Counters}$, particularly as the data type is varied. Accordingly, a conclusion can be made that there is no dependency to graph parameters as with the number of vertices or edges, which enables limiting of experimentation to counter array size and to generalize from such experimentation. Accordingly, a set of measurements can be obtained that describe a mean update time respectively latency L(M,T) which is a function of memory set size M and number of threads T. An additional observation can be made with respect to FIG. 11B is that with an increasing $M_{Counters}$ value the update time decreases as the contention is distributed across more memory locations, which appears to be an effect of a function of the logarithm of the counter array size rather than depending linearly on the counter array size.

Referring again to FIG. 11A, to derive a suitable heuristic that predicts L(M,T) for a given data set size M and thread count T, bounds can be identified for the memory access costs. As cache levels are discrete, we use the highest memory hierarchy level l that can fit the data set of size M. (e.g., $l=\min\{x: M_x > M\}$, with $M_x$ being a capacity of memory hierarchy level x. To approximate the effective access latency, a polynomial interpolation between the cache level l and u=l−1 can be used, with a rationale that higher cache levels will also observe some cache hits. Memory $M > M_m$ can be excluded, with $M_m$ referring to main memory size. The rationale that higher cache levels will also observe some cache hits holds true for l referring to main memory. For l=1 a special case can be handled, in which the problem fits into a L1 cache and a setting of u=l is performed, effectively configuring an identical lower and upper bound. As illustrated in an Equation (12) 1108, a (M) value 1110 can describe the polynomial interpolation, depending on data set size M. Note that Equation (12) uses the logarithm of the data set size, according to the observation made in FIG. 11A.

An Equation (13) 1112 shows calculations to determine a difference δL(T,l) 1114 between the latency of the two memory hierarchy levels l and u, with u derived from l as described above. An Equation (14) 1116 shows calculations to determine an update time prediction $L_{predict}(M,T)$ 1118 as a function of the access cost of a lower bound $L(M_l, T)$ 1120, but effectively reduced by a δL(T) value 1122 multiplied with the previous interpolation S(M,T) 1124 cubed. Cubing S(M,T) be be performed based on results that have been empirically derived from experiments on multiple systems that showed a best fit in different regressions.

Figure 11C:
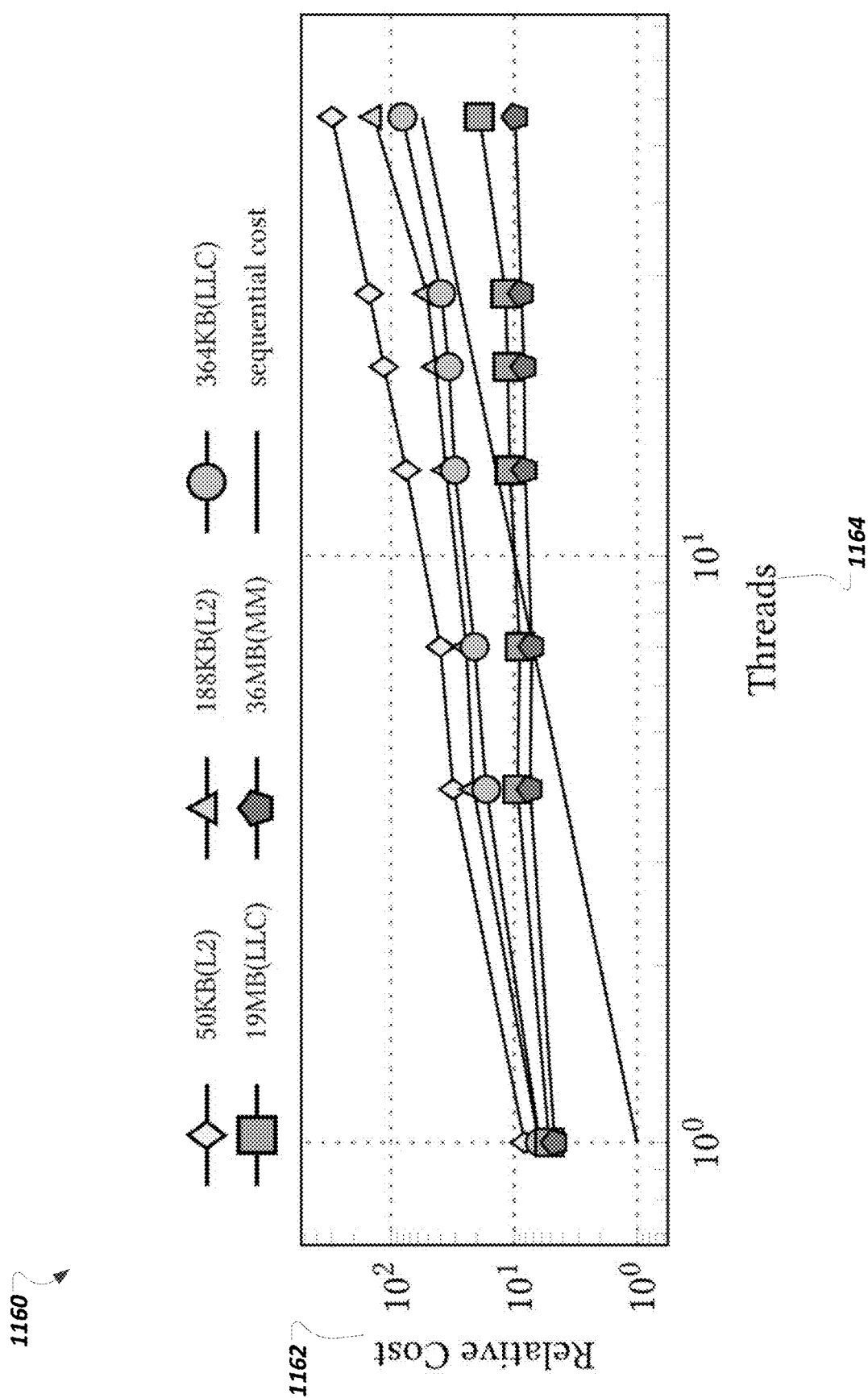
FIG. 11C is a graph that plots relative cost for atomics as a function of thread count and counter array size.

FIG. 11C is a graph 1160 that plots relative cost 1162 for atomics as a function of thread count 1164 and counter array size. Another important factor for the update time prediction are dynamic effects that depend on the number of threads. The graph 1160 illustrates a clear dependency between the number of threads and the atomic update time. Furthermore, the graph 1160 indicates that when limiting the problem to higher cache levels (e.g., by adapting problem size), thread count has a much higher impact on atomic update time. To address this dependency, the atomic update time can be estimated using the measured access times with the anticipated number of threads.

FIG. 12 is a flowchart of an example method for configuring graph query parallelism for high system throughput. It will be understood that method 1200 and related methods may be performed, for example, by any suitable system, environment, software, and hardware, or a combination of systems, environments, software, and hardware, as appropriate. For example, one or more of a client, a server, or other computing device can be used to execute method 1200 and related methods and obtain any data from the memory of a client, the server, or the other computing device. In some implementations, the method 1200 and related methods are executed by one or more components of the system 100 described above with respect to FIG. 1. For example, the method 1200 and related methods can be executed by the graph engine 110 of FIG. 1.

At 1202, a graph query to be executed against a graph database is received. The graph query can be received from a client device, for example.

At 1204, system properties are determined of a system in which the graph query is to be executed. The system properties can include cache sizes and memory access times.

At 1206, algorithmic properties are determined of at least one graph algorithm to be used to execute the graph query against the graph database. The algorithmic properties can include memory consumption and amount of memory accessed by atomic and non-atomic operations.

At 1208, graph data statistics for the graph database are determined. The graph data statistics can include vertex degrees and vertex degree distribution information.

At 1210, first graph traversal estimations are determined for a first iteration of the graph query.

At 1212, a first estimated cost model is determined for the first iteration based on the first graph traversal estimations. The cost model estimation step can be skipped after the first iteration in some cases, such as when it is known that the processed data is not changed and no runtime feedback is used (e.g., for page rank scenarios). The estimated graph traversal information can include estimates for number of newly-visited vertices and number of touched vertices for the first iteration. When more than one graph algorithm is being evaluated, a first estimated cost model can be determined for each algorithm. An algorithm that has a lowest cost model can be identified as a selected algorithm for further evaluation.

At 1214, first estimated thread boundaries are determined for performing parallel execution of the first iteration.

At 1216, based on the first estimated cost model, first work packages are generated that include vertices to be processed during the execution of the first iteration. Generating the work packages can include creating a set of work packages that each have a substantially similar cost.

At 1218, the first work packages are provided to a work package scheduler for scheduling the first work packages to execute the first iteration. The work package scheduler can determine which of the first work packages are executed in parallel and which of the first work packages are executed sequentially.

At 1220, data is determined for a next iteration. For example, a next set of vertices to process in a second iteration can be determined. Second graph traversal estimations, a second cost model, and second estimated thread boundaries can be determined for the second iteration. Second work packages can be generated for the second iteration and the second work packages can be provided to the work package scheduler. As mentioned, in some cases, cost model estimation can be performed only for the first iteration and not for subsequent iterations.

In an evaluation phase, the system was evaluated based on various variants of PR and BFS algorithms. PR algorithms were evaluated as a topology-centric algorithm variant using two different types—push and pull. In the push variant, the updates to compute the ranks are pushed to the target vertices, which can involve an atomic operation for each update. The pull variant, which does not require atomic operations, can involve gathering data from all source vertices to compute a rank. BFS algorithms can be considered data-driven algorithm and can be implemented as a top-down variant. Each type of evaluated algorithm can use different schedulers (e.g., sequential, simple-parallel, system scheduler). A sequential scheduler can execute code sequentially. Simple-parallel scheduling can involve executing code in parallel using a simple work partitioning that partitions the frontier queue in equal-sized packages. A common package size can be determined by a maximum number of threads value and a lower limit. The system scheduler uses the scheduler described above. Sequentially scheduled variants can serve in concurrent query settings as a baseline, since under high concurrency, a per-query sequential processing is typically preferable. Since the behavior of graph computations can be highly data-dependent, different synthetic data sets are evaluated with different scale factors (SF), and various real-world data sets are evaluated. Synthetic data sets can be generated using a recursive matrix (RMAT) approach. For scale factors, the following equations can be relevant:

$$|V|=2^{SF}, |E|=16*|V|.$$

As described in more detail below, for both PR and BFS evaluations, the use of the system scheduler resulted in efficient executions, with the system scheduler being the most efficient or close in efficiency to the best performing alternative, for different types of data sets and configurations. Particularly for PR evaluations, system scheduler pull and system scheduler push approaches were substantially faster than alternatives. Additionally, for BFS evaluations, the system scheduler approach performs better or similarly to sequential and simple parallel approaches, for different types of data sets.

Figure 13A:
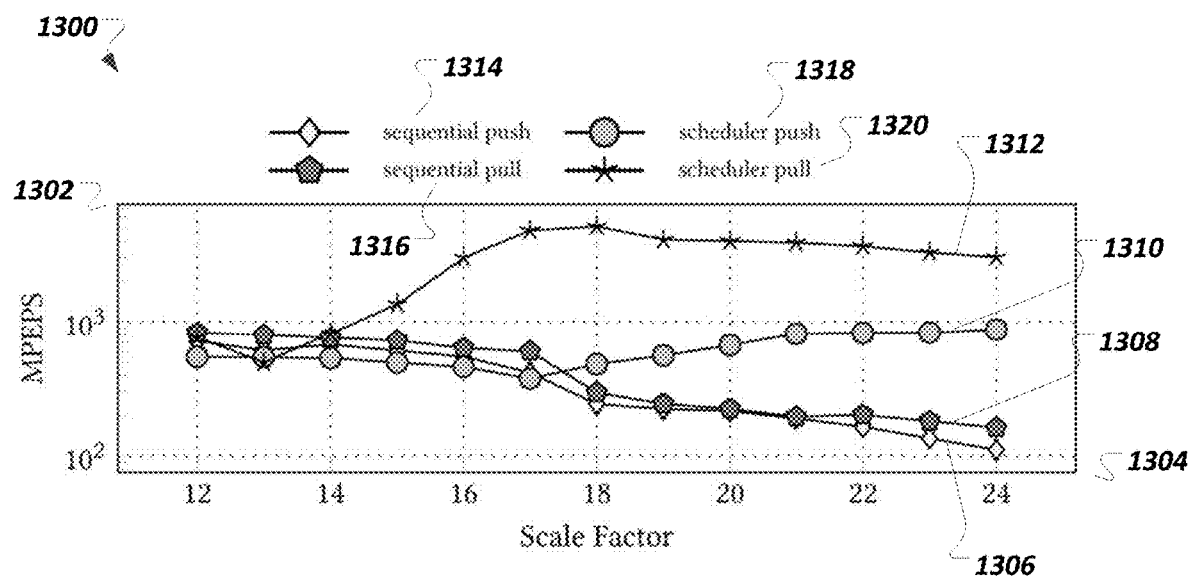
FIGS. 13A-B are evaluation graphs that illustrate performance results for page rank algorithms for single query execution.
Figure 13B:
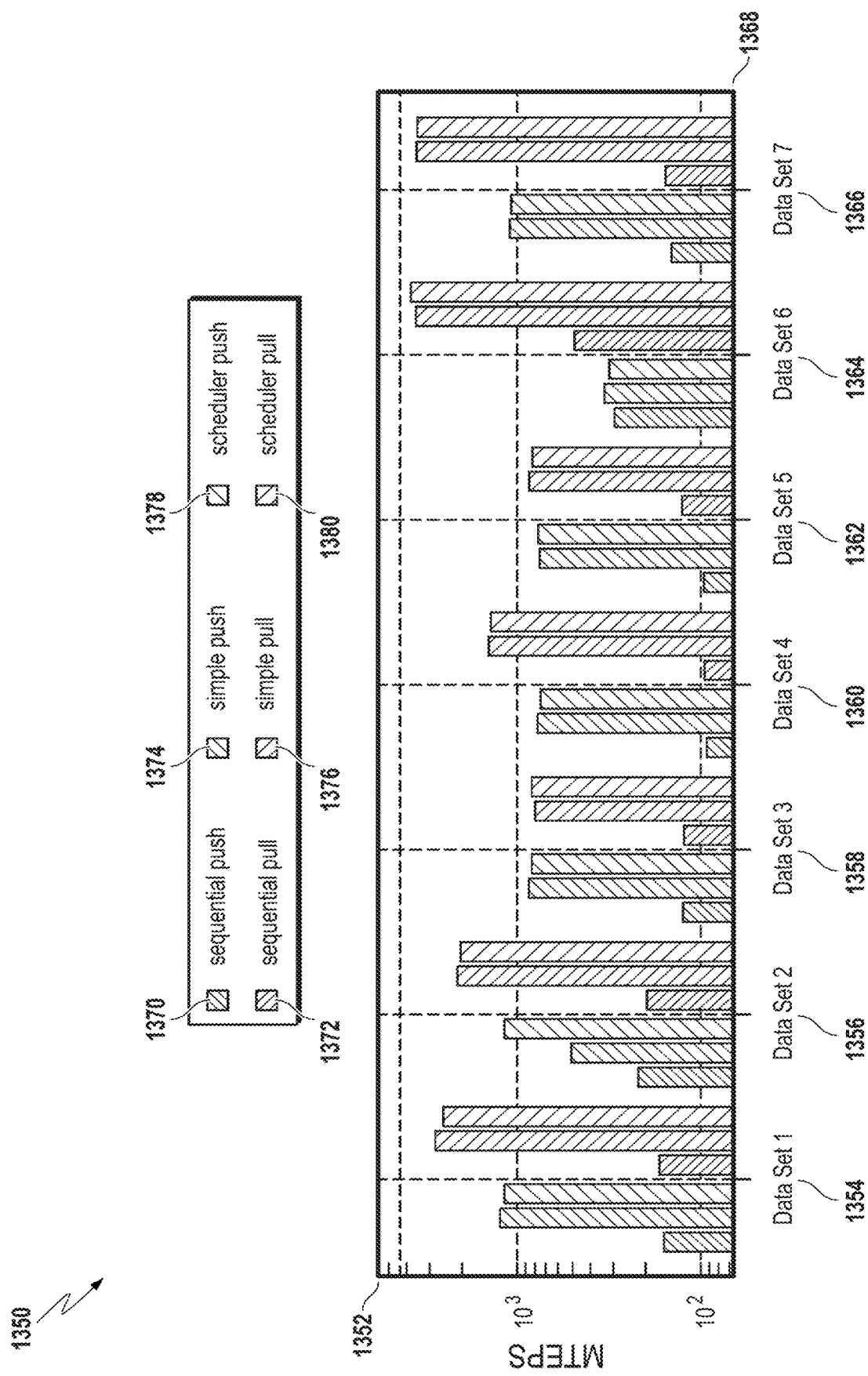

FIGS. 13A-B are evaluation graphs 1300 and 1350 that illustrate performance results for page rank algorithms for single query execution. During evaluation, single query performance can be evaluated to identify scheduling overhead. For instance, the evaluation graph 1300 plots performance scaling on a Y-axis 1302 in MPEPS (millions of processed edges per second), for different PR implementations across synthetic RMAT graphs of different sizes (e.g., different PR implementations are presented on an X-axis 1304, according to scale factor). In the evaluation graph 1300 in FIG. 13A, lines 1306, 1308, 1310, and 1312 plot performance for a sequential push evaluation 1314, a sequential pull evaluation 1316, a system scheduler push evaluation 1318, and a system scheduler pull evaluation 1320, respectively.

Single-query PR performance can depend on problem size and algorithm, although pull versions may generally perform better than push algorithms. In general, push and pull algorithms may have substantially different properties can therefore also differ in respective cost models. As illustrated by lines 1306 and 1308 in the evaluation graph 1300, sequential processing is faster for small problem sizes (e.g., SF<=14 for push and SF<=18 for pull), otherwise parallel processing is faster. The overhead of the system scheduling method can be assessed by comparing system scheduler performance to sequential performance. For example, system scheduler push results can be compared to sequential push results. In comparing the lines 1310 and 1306, for lower scale factors, the system scheduler variant behaves similarly to the sequential variant, with only a small (e.g., 3% at SF17–30% at SF of 12) reduction in performance). Thus, in spite of fundamental differences between push and pull variants, in particular with regard to the use of atomics, the system scheduler chooses the right execution strategy, so that the overhead never dominates the elapsed time.

The evaluation graph 1350 in FIG. 13B plots performance scaling on a Y-axis 1352 for different real-world data sets 1354, 1356, 1358, 1360, 1362, 1364, and 1366 that are plotted on a X-axis 1368. For each data set, evaluation results are plotted as bar graphs for a sequential push evaluation 1370, a sequential pull evaluation 1372, a simple push evaluation 1374, a simple pull evaluation 1376, a system scheduler push evaluation 1378, and a system scheduler pull evaluation 1380, respectively.

The evaluation graph 1350 shows that for different data sets and a single query PR, differences between values from the simple push evaluation 1374 and scheduling-optimized counterpart values (e.g., from the system scheduler push evaluation 1378) is negligible, with either the simple push values or the system scheduler push values having only small advantages compared to the other, depending on the data set. The differences for pull variants are similarly small. Thus, for PR algorithms, the system scheduler is stable across different data sets and the scheduling overhead is small.

Figure 14A:
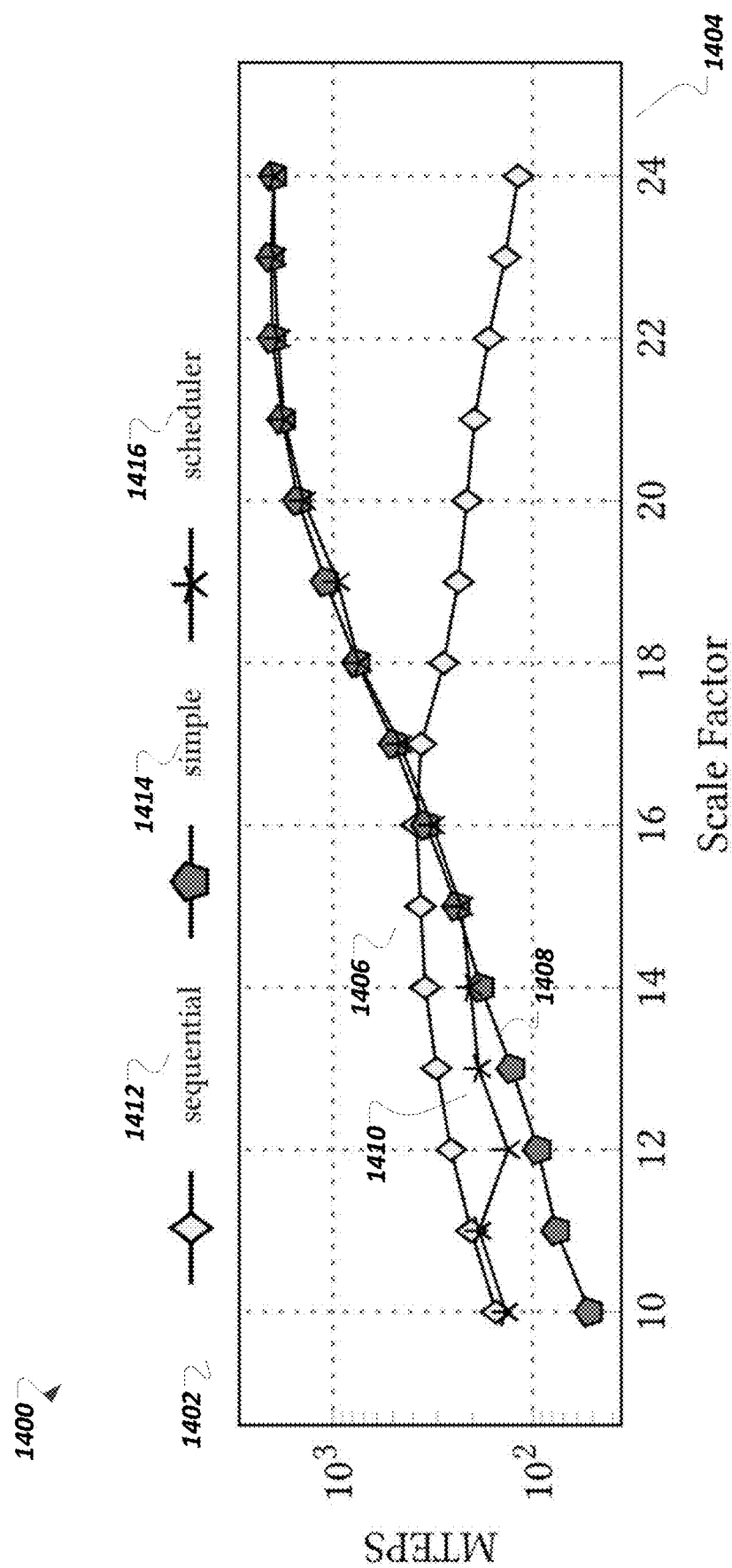
FIGS. 14A-14B are evaluation graphs that illustrate performance results for breadth-first search algorithms for single query execution.
Figure 14B:
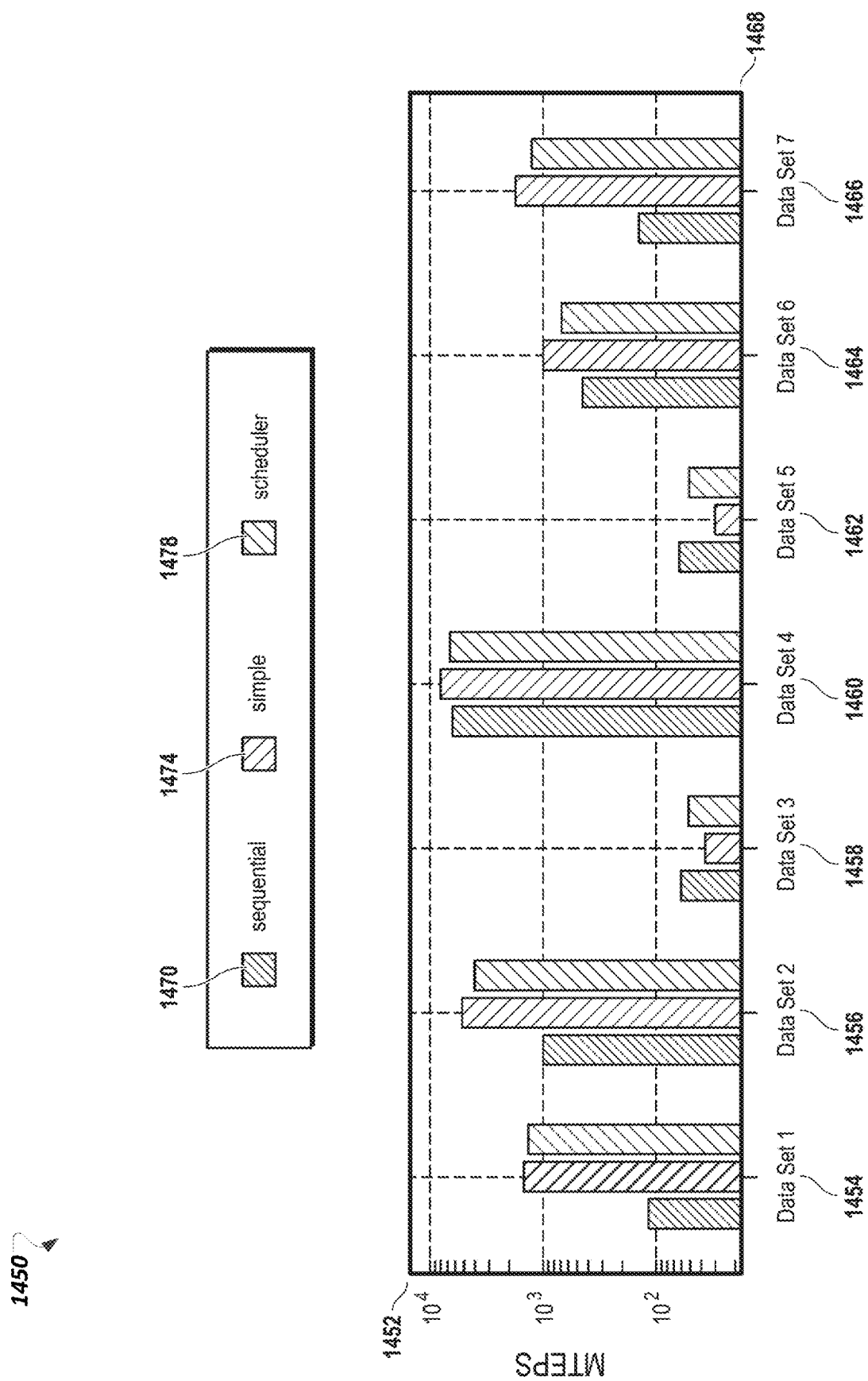

FIGS. 14A-14B are evaluation graphs 1400 and 1450 that illustrate performance results for breadth-first search algorithms for single query execution. Similar to the evaluation graph 1300, the evaluation graph 1400 plots performance scaling on a Y-axis 1402 in MPEPS for different BFS implementations across RMAT graphs of different sizes (e.g., different BFS implementations are presented on an X-axis 1404, according to scale factor). In the evaluation graph 1400 in FIG. 14A, lines 1406, 1408, and 1410 plot performance for a sequential evaluation 1412, a simple evaluation 1414, and a system scheduler evaluation 1416, respectively.

Similar to results for PR algorithms, data set size may determine a preferred algorithm choice. For example, for SF<=16 and as illustrated by the line 1406, sequential processing was fastest. For higher scale factors (e.g., SF>16) and as respectively illustrated by the lines 1408 and 1410, simple (e.g., straight-forward range partitioning of the frontier queue) and system scheduler algorithms were faster. For the smaller scale factors (e.g., SF<16), the system scheduler algorithm outperformed the simple algorithm, due to reducing false invalidations by reducing concurrent writes to same memory locations. The similarity in the lines 1408 and 1410 (e.g., especially for SF>16) illustrate that the scheduling optimizations from the system scheduler approach come with negligible overhead in comparison to simple parallelization.

The evaluation graph 1450 in FIG. 14B illustrates breadth-first search performance on real-world data sets data set 1452, 1454, 1456, 1458, 1460, 1462, and 1464, for a sequential evaluation 1466, a simple evaluation 1468, and a system scheduler evaluation 1470. For single query execution, BFS performance can be highly data-dependent. Accordingly, the system scheduler can, for some data sets, be slower than the simple approach, which is based on naive parallelization, albeit with only small differences and usually only if a difference to between the system scheduler approach and a sequential approach is substantial. System scheduling overhead can be generally constant even when BFS processing time is highly dependent on the data set. Accordingly, for a small BFS execution time, scheduling overhead can be more significant than for longer BFS execution times. Furthermore, results suggest that for data sets that resulted in lower performance (e.g., the data set 1456 and the data set 1458), the system scheduler approach outperformed the simple approach, such as due to complex dependencies (e.g., between edges) and fewer parallelization opportunities as compared to other data sets.

As shown in FIG. 14B, the system scheduler approach is either a best performing approach or close to the best performing approach, independent of particular data set characteristics. In summary, scheduling overhead for the system scheduler was negligible and scheduling optimizations can be beneficial for overall performance. As expected with a variety of data sets, graph computations (and resulting performance) can be highly dependent on a selected algorithm and the graph data of a particular data set. Despite the differences of algorithm variants and data sets, the performance of the system scheduler was generally stable across the various evaluated algorithm variants and data sets.

Figure 15:
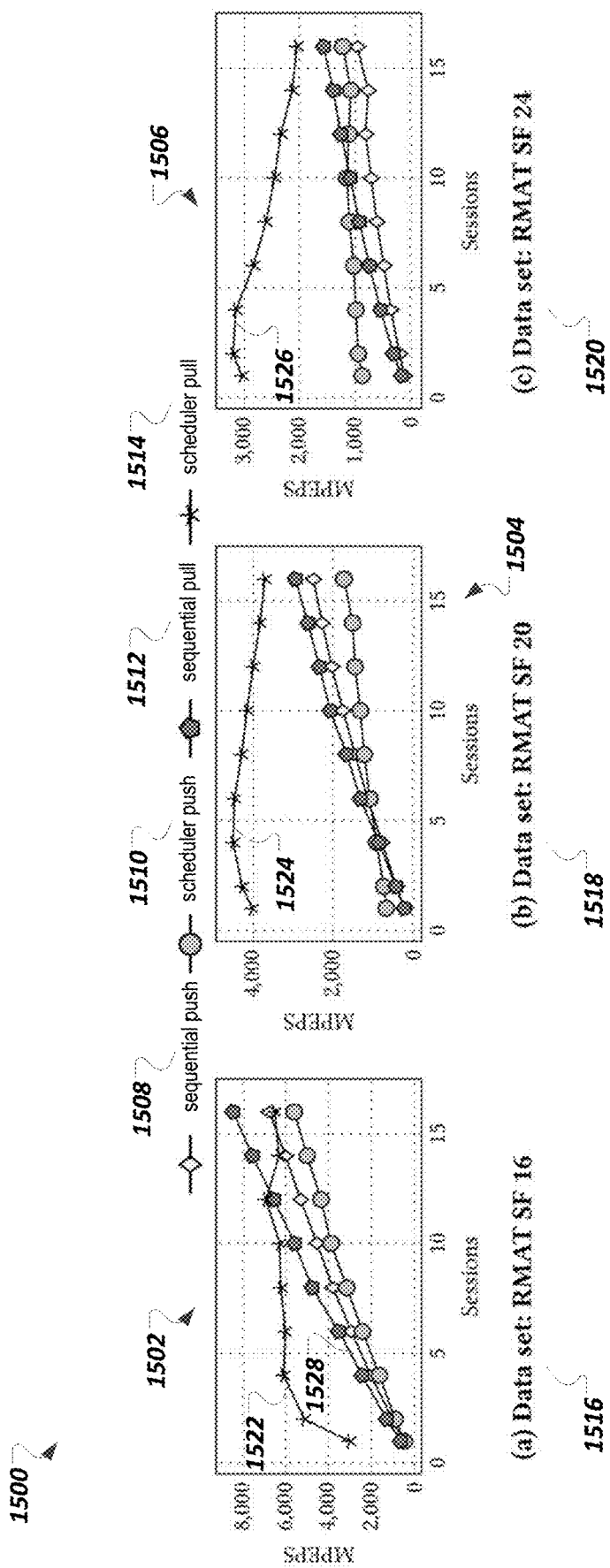
FIG. 15 illustrates evaluation graphs that illustrate performance results for page rank algorithms for multiple sessions for synthetic data sets.

FIG. 15 illustrates evaluation graphs 1500 that illustrate performance results for page rank algorithms for multiple sessions for synthetic data sets. The evaluation graphs 1500 include graphs 1502, 1504, and 1506 that plot results for a sequential push evaluation 1508, a system scheduler push evaluation 1510, a sequential pull evaluation 1512, and a system scheduler pull evaluation 1514, for a first data set 1516, a second data set 1518, and a third data set 1520, respectively. Each of the first data set 1516, the second data set 1518, and the third data set 1520 correspond to different scale factors. Lines 1522, 1524, and 1526 illustrate that the system scheduler approach provided the fastest performance among evaluated approaches. Performance advantages can depend on data set size and concurrency (e.g., number of sessions). For example and as shown by a line 1528, only for the smallest data set size (e.g., the first data set 1516 with SF of 16) and highest number of sessions is the sequential pull approach a fastest approach, which can be due to data sets in these scenarios providing few opportunities for parallelism. A break-even point between the system scheduler approach and the sequential pull approach can move towards larger amounts of concurrency as the data set size increases. For example, with increasing data set size an overhead of parallel execution becomes more negligible.

Figure 16:
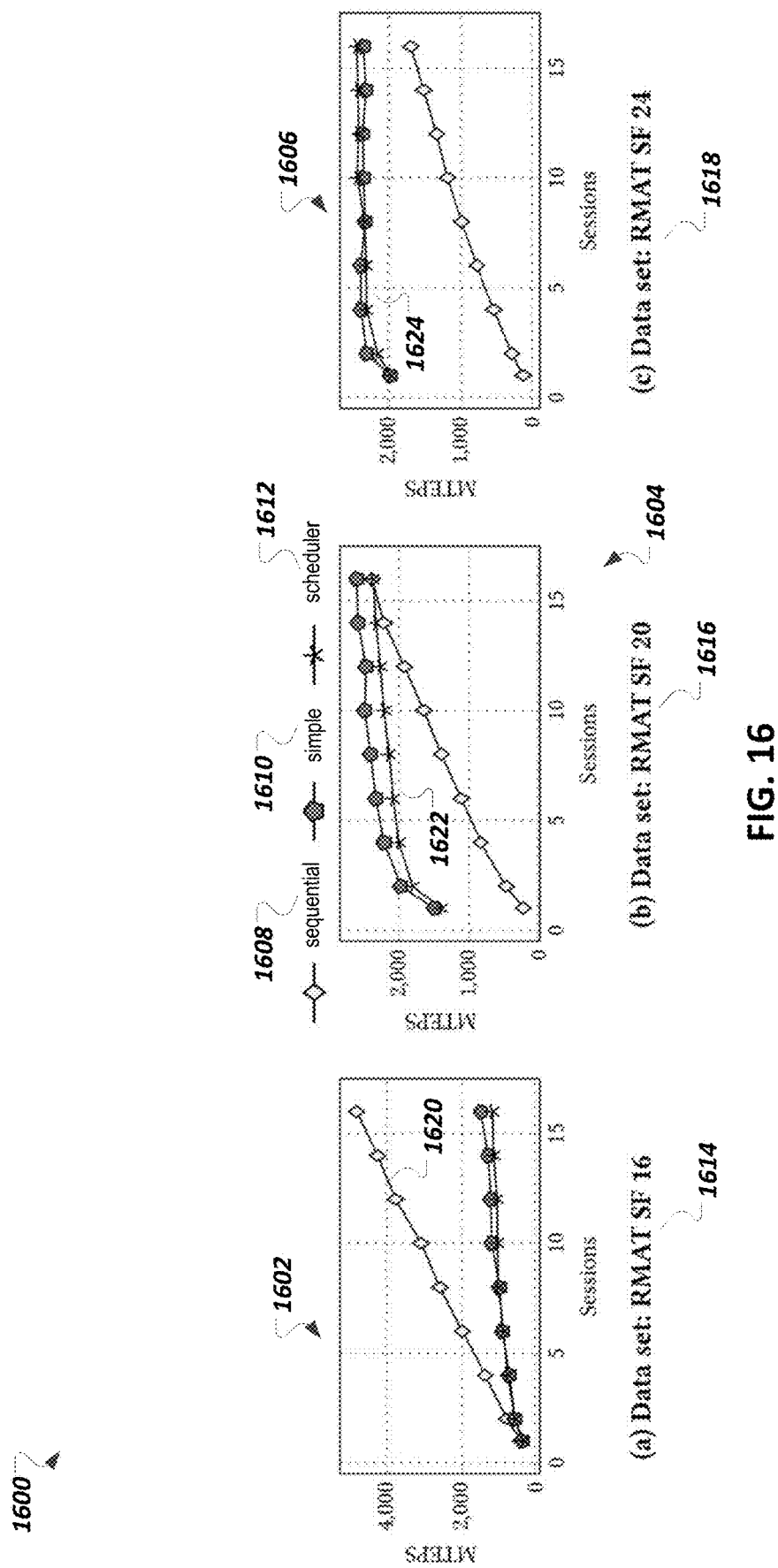
FIG. 16 illustrates evaluation graphs that illustrate performance results for breadth-first search algorithms for multiple sessions for synthetic data sets.

FIG. 16 illustrates evaluation graphs 1600 that illustrate performance results for BFS algorithms for multiple sessions for synthetic data sets. The evaluation graphs 1600 include graphs 1602, 1604, and 1606 that plot results for a sequential evaluation 1608, a simple evaluation 1610, and a system scheduler evaluation 1612, for a first data set 1614, a second data set 1616, and a third data set 1618, respectively. Each of the first data set 1614, the second data set 1616, and the third data set 1618 correspond to different scale factors.

As illustrated by a line 1620, for the first data 1614, sequential processing is the fastest, in particular with growing concurrency. As illustrated by lines 1622 and 1624, as data set sizes increase, the system scheduler performance improves. With smaller data set sizes, parallel processing can be less efficient but with larger data set sizes, parallel processing becomes more efficient.

Figure 17:
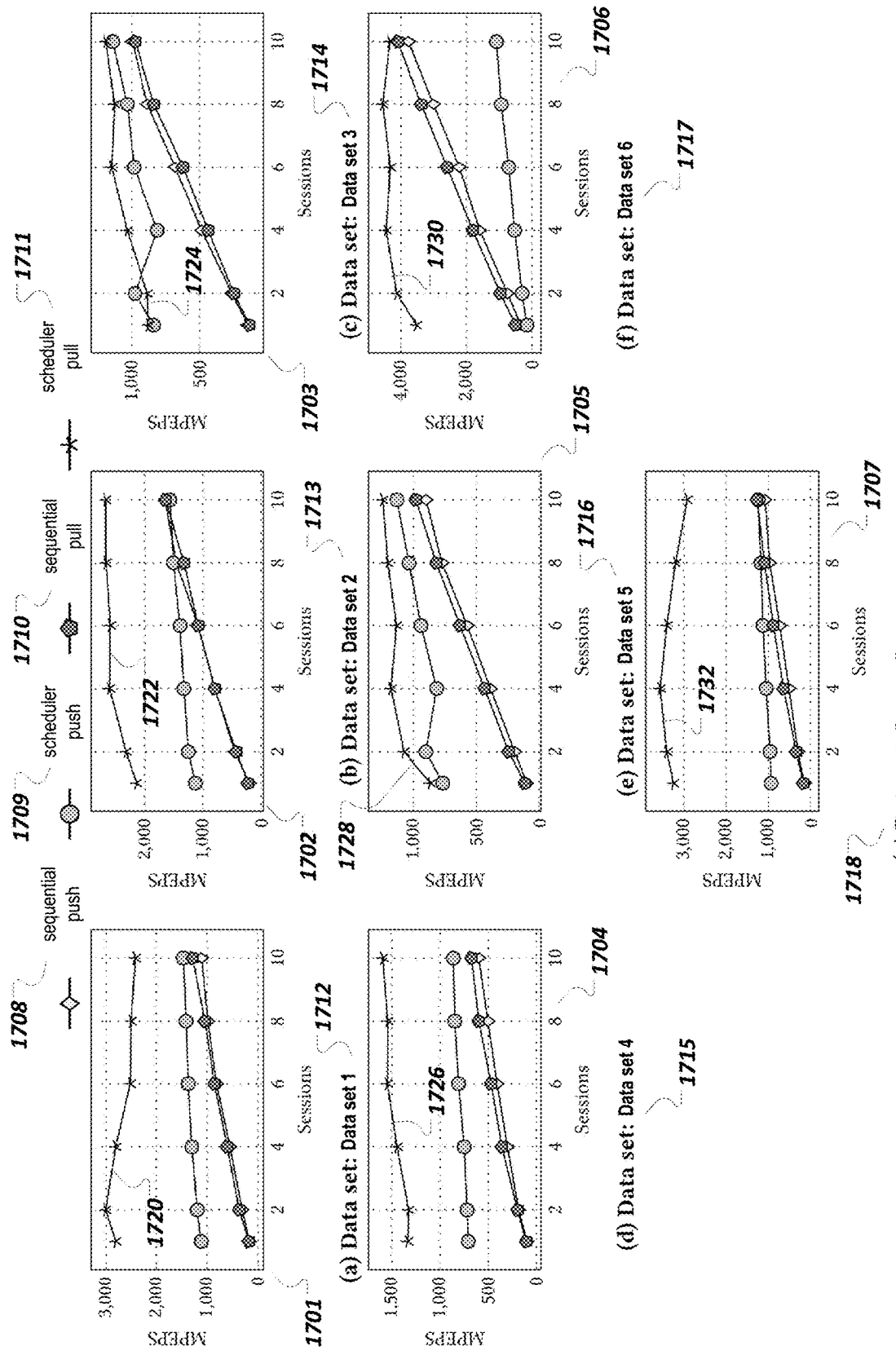
FIG. 17 illustrates evaluation graphs that illustrate performance results for page rank algorithms for multiple sessions for real world data sets.

FIG. 17 illustrates evaluation graphs 1700 that illustrate performance results for page rank algorithms for multiple sessions for real world data sets. The evaluation graphs 1700 include graphs 1701, 1702, 1703, 1704, 1705, 1706, and 1707 that plot results for a sequential push evaluation 1708, a scheduler push evaluation 1709, a sequential pull evaluation 1710, and a system scheduler pull evaluation 1711, for a first data set 1712, a second data set 1713, a third data set 1714, a fourth data set 1715, a fifth data set 1716, a sixth data set 1717, and a seventh data set 1718, respectively.

Lines 1720, 1722, 1724, 1726, 1728, 1730, and 1732 illustrate that the system scheduler pull approach is a fastest approach, independent of data set and concurrency. While the performance of the system scheduler pull approach is almost constant with regard to concurrency, performance of alternative approaches (e.g., sequential push and sequential pull) is usually scaling linearly with concurrency, which may suggest that for some data sets (e.g., the third data set 1714, the fifth data set 1716, and the sixth data set 1717), sequential alternative approaches can be similar to the performance of the system scheduler approach given sufficient concurrency. However, for other data sets (e.g., the fourth data set 1715 and the seventh data set 1718), a performance increase by concurrency for alternative sequential approaches is not enough to reach the performance of the system scheduler implementation (e.g., due to a different internal level of parallelism that these data sets allow).

Figure 18:
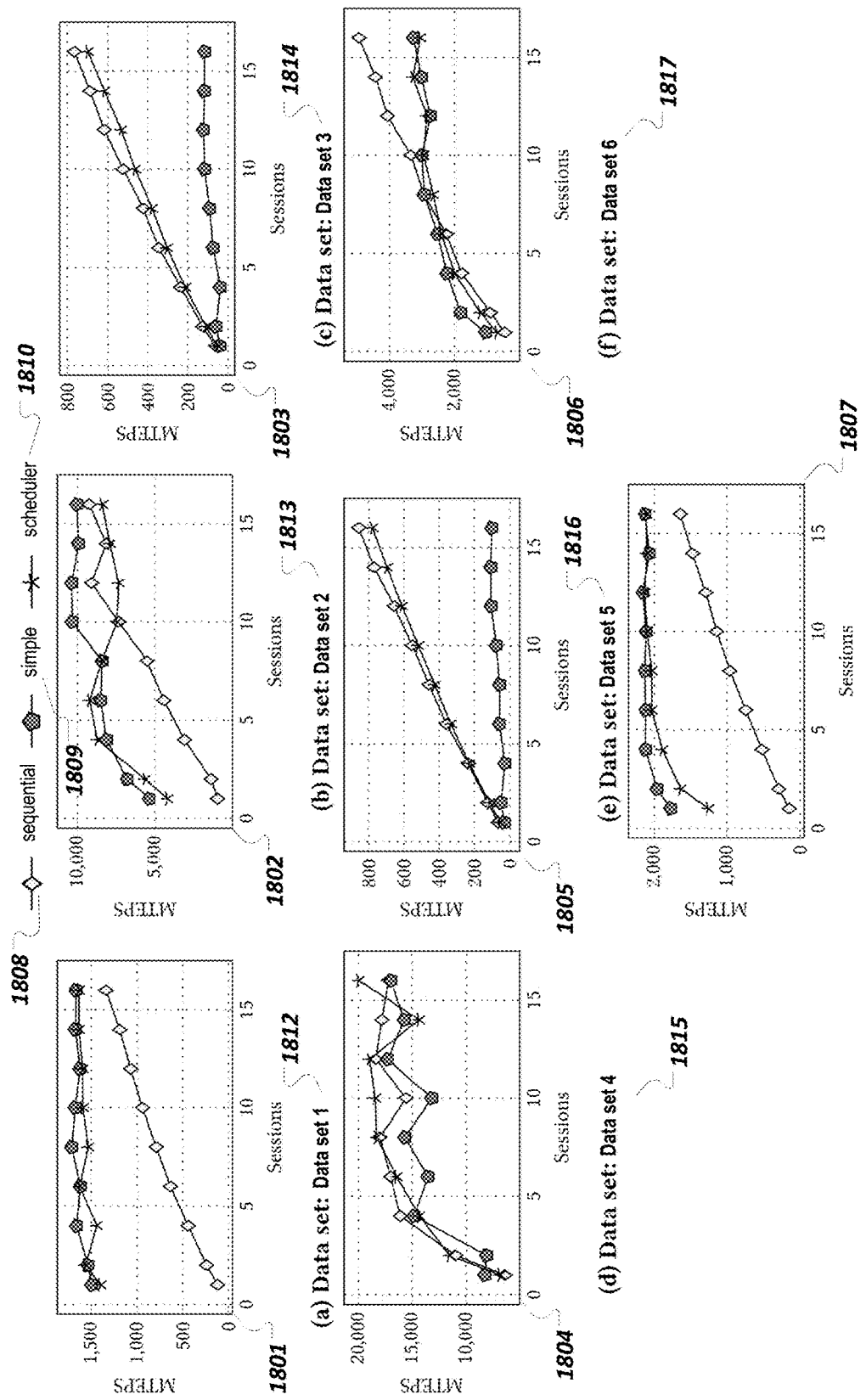
FIG. 18 illustrates evaluation graphs that illustrate performance results for breadth-first search algorithms for multiple sessions for real world data sets.

FIG. 18 illustrates evaluation graphs 1800 that illustrate performance results for bread-first search algorithms for multiple sessions for real world data sets. The evaluation graphs 1800 include graphs 1801, 1802, 1803, 1804, 1805, 1806, and 1807 that plot results for a sequential evaluation 1808, a simple evaluation 1809, and a system scheduler evaluation 1810, for a first data set 1812, a second data set 1813, a third data set 1814, a fourth data set 1815, a fifth data set 1816, a sixth data set 1817, and a seventh data set 1818, respectively. BFS algorithm performance can be highly dependent on data set and concurrency, and three general patterns can be observed.

In a first pattern, for the first data set 1812 and the seventh data set 1818, the simple parallel approach and the system scheduler approach are similarly fast, with the sequential approach substantially slower. However, the difference between the sequential approach and the other approaches decreases with increasing concurrency, which can be that concurrencies higher than those evaluated might result in a break-even point.

In a second pattern, for the second data set 1813 and the sixth data set 1817, performance of the three approaches is similar but with high variance depending on concurrency. Performance of the sequential approach, when slower at lower concurrencies tends to improve as concurrencies increase, sometimes even outperforming the other algorithms.

In a third pattern, for the third data set 1814 and the fifth data set 1816, performance for the sequential approach and the system scheduler approach are similar, with small advantages for sequential, and scaling is almost linear with concurrency. Simple parallel has a constant performance, resulting in a growing performance gap with the sequential and system scheduler approaches as concurrency increases.

The preceding figures and accompanying description illustrate example processes and computer-implementable techniques. But system 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, system 100 may use processes with additional operations, fewer operations, and/or different operations, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer-implemented method comprising:
receiving a graph query to be executed against a graph database that includes a set of vertices;
determining system properties of a system in which the graph query is to be executed;
determining algorithmic properties of at least one graph algorithm to be used to execute the graph query against the graph database;
determining graph data statistics for the graph database; and
for a first iteration of the graph query:
determining first graph traversal estimations for the first iteration of the graph query;
determining a first estimated cost model for the first iteration of the graph query based on the first graph traversal estimations;
determining first estimated thread boundaries for performing parallel execution of the first iteration of the graph query;
generating first work packages of a subset of the set of vertices to be processed during the execution of the first iteration of the graph query based on the first estimated cost model; and
providing the first work packages to a work package scheduler for scheduling the first work packages to execute the first iteration of the graph query.

2. The computer-implemented method of claim 1, wherein the work package scheduler determines which of the first work packages are executed in parallel and which of the first work packages are executed sequentially.

3. The computer-implemented method of claim 1, further comprising:
determining a next subset of vertices to process in a second iteration; and
determining second graph traversal estimations, a second cost model, and second estimated thread boundaries for the second iteration;
generating second work packages for the second iteration; and
providing the second work packages to the work package scheduler.

4. The computer-implemented method of claim 3, wherein the first estimated cost model is used for the second and subsequent iterations and the second cost model is not determined for the second iteration.

5. The computer-implemented method of claim 1, wherein generating the work packages comprises creating a set of work packages that each have a substantially similar cost.

6. The computer-implemented method of claim 1, wherein the system properties include cache sizes and memory access times.

7. The computer-implemented method of claim 1, wherein the algorithmic properties include memory consumption and amount of memory accessed by atomic and non-atomic operations.

8. The computer-implemented method of claim 1, wherein the graph data statistics include vertex degrees and vertex degree distribution information.

9. The computer-implemented method of claim 1, wherein the estimated graph traversal information includes estimates for number of newly-visited vertices and number of touched vertices for the first iteration.

10. The computer-implemented method of claim 1, further comprising, when algorithmic properties are determined for more than one graph algorithm, determining a first estimated cost model for each graph algorithm and selecting a graph algorithm with a lowest first estimated cost model for further evaluation.

11. A system comprising:
one or more computers; and
a computer-readable medium coupled to the one or more computers having instructions stored thereon which, when executed by the one or more computers, cause the one or more computers to perform operations comprising:
receiving a graph query to be executed against a graph database that includes a set of vertices;
determining system properties of a system in which the graph query is to be executed;
determining algorithmic properties of at least one graph algorithm to be used to execute the graph query against the graph database;
determining graph data statistics for the graph database; and
for a first iteration of the graph query:
determining first graph traversal estimations for the first iteration of the graph query;
determining a first estimated cost model for the first iteration of the graph query based on the first graph traversal estimations;
determining first estimated thread boundaries for performing parallel execution of the first iteration of the graph query;
generating first work packages of a subset of the set of vertices to be processed during the execution of the first iteration of the graph query based on the first estimated cost model; and
providing the first work packages to a work package scheduler for scheduling the first work packages to execute the first iteration of the graph query.

12. The system of claim 11, wherein the work package scheduler determines which of the first work packages are executed in parallel and which of the first work packages are executed sequentially.

13. The system of claim 11, wherein the operations further comprise:
determining a next subset of vertices to process in a second iteration; and
determining second graph traversal estimations, a second cost model, and second estimated thread boundaries for the second iteration;
generating second work packages for the second iteration; and
providing the second work packages to the work package scheduler.

14. The system of claim 13, wherein the first estimated cost model is used for the second and subsequent iterations and the second cost model is not determined for the second iteration.

15. The system of claim 11, wherein generating the work packages comprises creating a set of work packages that each have a substantially similar cost.

16. A computer program product encoded on a non-transitory storage medium, the product comprising non-transitory, computer readable instructions for causing one or more processors to perform operations comprising:
receiving a graph query to be executed against a graph database that includes a set of vertices;
determining system properties of a system in which the graph query is to be executed;

determining algorithmic properties of at least one graph algorithm to be used to execute the graph query against the graph database;

determining graph data statistics for the graph database; and for a first iteration of the graph query:
- determining first graph traversal estimations for the first iteration of the graph query;
- determining a first estimated cost model for the first iteration of the graph query based on the first graph traversal estimations;
- determining first estimated thread boundaries for performing parallel execution of the first iteration of the graph query;
- generating first work packages of a subset of the set of vertices to be processed during the execution of the first iteration of the graph query based on the first estimated cost model; and
- providing the first work packages to a work package scheduler for scheduling the first work packages to execute the first iteration of the graph query.

17. The computer program product of claim 16, wherein the work package scheduler determines which of the first work packages are executed in parallel and which of the first work packages are executed sequentially.

18. The computer program product of claim 16, wherein the operations further comprise:
- determining a next subset of vertices to process in a second iteration; and
- determining second graph traversal estimations, a second cost model, and second estimated thread boundaries for the second iteration;
- generating second work packages for the second iteration; and
- providing the second work packages to the work package scheduler.

19. The computer program product of claim 18, wherein the first estimated cost model is used for the second and subsequent iterations and the second cost model is not determined for the second iteration.

20. The computer program product of claim 16, wherein generating the work packages comprises creating a set of work packages that each have a substantially similar cost.

* * * * *